US012226662B2

(12) United States Patent
Koga et al.

(10) Patent No.: US 12,226,662 B2
(45) Date of Patent: Feb. 18, 2025

(54) SYSTEM AND METHOD FOR THERMAL DETECTION, SUPPRESSION, AND DISCHARGE

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Bryon, MN (US); Zachary L. Klein, Rochester, MN (US); Jerrod Kappers, Oshkosh, WI (US); Derek A. Wente, Austin, TX (US); Logan Gary, Oshkosh, WI (US); Joshua D. Rocholl, Rochester, MN (US); Chad K. Smith, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 722 days.

(21) Appl. No.: 17/484,098

(22) Filed: Sep. 24, 2021

(65) Prior Publication Data

US 2022/0096884 A1 Mar. 31, 2022

Related U.S. Application Data

(60) Provisional application No. 63/084,442, filed on Sep. 28, 2020.

(51) Int. Cl.

| | |
|---|---|
| *A62C 3/07* | (2006.01) |
| *B65F 3/02* | (2006.01) |
| *B65F 3/04* | (2006.01) |

(52) U.S. Cl.

CPC ................ *A62C 3/07* (2013.01); *B65F 3/041* (2013.01); *B65F 2003/0269* (2013.01); *B65F 2003/0279* (2013.01)

(58) Field of Classification Search

CPC .... A62C 3/07; B65F 3/041; B65F 2003/0269; B65F 2003/0279

USPC ........................................................... 169/62

See application file for complete search history.

(56) References Cited

U.S. PATENT DOCUMENTS

| | | | |
|---|---|---|---|
| 2,946,802 | A | 7/1960 | Zima et al. |
| 4,411,318 | A | 10/1983 | Zeischegg et al. |
| 5,171,121 | A | 12/1992 | Smith et al. |
| 5,378,010 | A | 1/1995 | Marino et al. |
| 9,981,803 | B2 | 5/2018 | Davis et al. |
| D869,332 | S | 12/2019 | Gander et al. |
| D899,452 | S | 10/2020 | Klimes et al. |
| 10,800,605 | B2 | 10/2020 | Rocholl et al. |
| 10,843,379 | B2 | 11/2020 | Rocholl et al. |
| 10,858,231 | B2 | 12/2020 | Holmes et al. |
| 10,859,167 | B2 | 12/2020 | Jax et al. |
| D910,670 | S | 2/2021 | Klimes et al. |

(Continued)

*Primary Examiner* — Christopher S Kim

(74) *Attorney, Agent, or Firm* — Foley & Lardner LLP

(57) ABSTRACT

A refuse vehicle includes a chassis supporting a plurality of wheels, a vehicle body supported by the chassis and defining a receptacle for storing refuse therein, a lifting system coupled to the vehicle body and movable relative to the receptacle, wherein the lifting system is configured to lift a refuse container and empty refuse in the refuse container into the receptacle, at least one sensor configured to detect a thermal event in or near the refuse container, wherein the lifting system is configured to stop lifting the refuse container in response to the thermal event being detected.

13 Claims, 19 Drawing Sheets

(56) References Cited

U.S. PATENT DOCUMENTS

| | | | |
|---|---|---|---|
| 10,997,802 | B2 | 5/2021 | Koga et al. |
| 11,001,135 | B2 | 5/2021 | Yakes et al. |
| 11,001,440 | B2 | 5/2021 | Rocholl et al. |
| 11,007,863 | B2 | 5/2021 | Yakes et al. |
| 11,021,078 | B2 | 6/2021 | Rocholl et al. |
| 11,046,329 | B2 | 6/2021 | Clifton et al. |
| 11,059,436 | B2 | 7/2021 | Wildgrube et al. |
| 11,097,617 | B2 | 8/2021 | Rocholl et al. |
| 11,110,977 | B2 | 9/2021 | Smith et al. |
| 11,136,187 | B1 | 10/2021 | Koga et al. |
| 11,137,002 | B2 | 10/2021 | Clifton et al. |
| 11,148,550 | B2 | 10/2021 | Rocholl et al. |
| 11,148,880 | B1 | 10/2021 | Koga et al. |
| 11,161,415 | B1 | 11/2021 | Koga et al. |
| 11,167,919 | B1 | 11/2021 | Koga et al. |
| 11,254,498 | B1 | 2/2022 | Koga et al. |
| 11,254,499 | B2 | 2/2022 | Rocholl et al. |
| 11,254,500 | B2 | 2/2022 | Buege et al. |
| 2002/0071336 | A1 | 6/2002 | Smith et al. |
| 2018/0265289 | A1 | 9/2018 | Davis et al. |
| 2019/0039407 | A1 | 2/2019 | Smith |
| 2019/0322321 | A1 | 10/2019 | Schwartz et al. |
| 2020/0030647 | A1 | 1/2020 | Ryczek |
| 2020/0262366 | A1 | 8/2020 | Wildgrube et al. |
| 2020/0265656 | A1 | 8/2020 | Koga et al. |
| 2020/0316816 | A1 | 10/2020 | Messina et al. |
| 2020/0317083 | A1 | 10/2020 | Messina et al. |
| 2020/0346547 | A1 | 11/2020 | Rocholl et al. |
| 2020/0346556 | A1 | 11/2020 | Rocholl et al. |
| 2020/0346557 | A1 | 11/2020 | Rocholl et al. |
| 2020/0346657 | A1 | 11/2020 | Clifton et al. |
| 2020/0346854 | A1 | 11/2020 | Rocholl et al. |
| 2020/0346855 | A1 | 11/2020 | Rocholl et al. |
| 2020/0346856 | A1 | 11/2020 | Rocholl et al. |
| 2020/0346858 | A1 | 11/2020 | Buege et al. |
| 2020/0346859 | A1 | 11/2020 | Buege et al. |
| 2020/0346861 | A1 | 11/2020 | Rocholl et al. |
| 2020/0346862 | A1 | 11/2020 | Rocholl et al. |
| 2020/0347659 | A1 | 11/2020 | Rocholl et al. |
| 2020/0347661 | A1 | 11/2020 | Rocholl et al. |
| 2020/0348681 | A1 | 11/2020 | Clifton et al. |
| 2020/0348764 | A1 | 11/2020 | Clifton et al. |
| 2020/0399058 | A1 | 12/2020 | Rocholl et al. |
| 2021/0031649 | A1 | 2/2021 | Messina et al. |
| 2021/0054942 | A1 | 2/2021 | Jax et al. |
| 2021/0069934 | A1 | 3/2021 | Rocholl et al. |
| 2021/0070595 | A1 | 3/2021 | Holmes et al. |
| 2021/0139303 | A1 | 5/2021 | Rosencrance et al. |
| 2021/0221216 | A1 | 7/2021 | Yakes et al. |
| 2021/0225095 | A1 | 7/2021 | Koga et al. |
| 2021/0229755 | A1 | 7/2021 | Schwartz et al. |
| 2021/0229908 | A1 | 7/2021 | Rocholl et al. |
| 2021/0252995 | A1 | 8/2021 | Rocholl et al. |
| 2021/0316740 | A1 | 10/2021 | Clifton et al. |
| 2021/0316741 | A1 | 10/2021 | Clifton et al. |
| 2021/0323436 | A1 | 10/2021 | Rocholl et al. |
| 2021/0323437 | A1 | 10/2021 | Rocholl et al. |
| 2021/0323438 | A1 | 10/2021 | Rocholl et al. |
| 2021/0323763 | A1 | 10/2021 | Koga et al. |
| 2021/0323764 | A1 | 10/2021 | Koga et al. |
| 2021/0324880 | A1 | 10/2021 | Wente et al. |
| 2021/0325529 | A1 | 10/2021 | Koga et al. |
| 2021/0325911 | A1 | 10/2021 | Koga et al. |
| 2021/0326550 | A1 | 10/2021 | Kappers et al. |
| 2021/0327164 | A1 | 10/2021 | Koga et al. |
| 2021/0327170 | A1 | 10/2021 | Rocholl et al. |
| 2021/0327237 | A1 | 10/2021 | Rocholl et al. |
| 2021/0331635 | A1 | 10/2021 | Wildgrube et al. |
| 2021/0331636 | A1 | 10/2021 | Wildgrube et al. |
| 2021/0331637 | A1 | 10/2021 | Wildgrube et al. |
| 2021/0339632 | A1 | 11/2021 | Rocholl et al. |
| 2021/0339648 | A1 | 11/2021 | Koga et al. |
| 2021/0339949 | A1 | 11/2021 | Rocholl et al. |
| 2021/0345062 | A1 | 11/2021 | Koga et al. |
| 2021/0373560 | A1 | 12/2021 | Koga et al. |
| 2021/0380179 | A1 | 12/2021 | Smith et al. |
| 2021/0396251 | A1 | 12/2021 | Clifton et al. |
| 2021/0407222 | A1 | 12/2021 | Koga et al. |
| 2022/0009338 | A1 | 1/2022 | Yakes et al. |
| 2022/0033181 | A1 | 2/2022 | Koga et al. |

SYSTEM AND METHOD FOR THERMAL DETECTION, SUPPRESSION, AND DISCHARGE

CROSS-REFERENCE TO RELATED APPLICATION

This application claims priority to U.S. Provisional Patent Application No. 63/084,442, filed Sep. 28, 2020, the content of which is hereby incorporated by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One exemplary embodiment relates to a refuse vehicle. The refuse vehicle includes a chassis supporting a plurality of wheels, a vehicle body supported by the chassis and defining a receptacle for storing refuse therein, a lifting system coupled to the vehicle body and movable relative to the receptacle, wherein the lifting system is configured to lift a refuse container and empty refuse in the refuse container into the receptacle, and at least one sensor configured to detect a thermal event in or near the refuse container, wherein the lifting system is configured to stop lifting the refuse container in response to the thermal event being detected.

Another exemplary embodiment relates to a refuse vehicle. The refuse vehicle includes a chassis supporting a plurality of wheels, a vehicle body supported by the chassis and defining a receptacle for storing refuse therein, wherein the receptacle includes a hopper volume and a storage volume, a separator selectively dividing the hopper volume and the storage volume and movable between an open position and a closed position, wherein the separator is positioned between the hopper volume and the storage volume in the closed position, a lifting system coupled to the vehicle body and movable relative to the receptacle, wherein the lifting system is configured to lift a refuse container and empty refuse from the refuse container and into the hopper volume of the receptacle, and a first sensor configured to detect a thermal event in the hopper volume, wherein the separator is configured to move to the closed position in response to detecting a thermal event in the hopper volume.

Another exemplary embodiment relates to a method of detecting a thermal event proximate a refuse vehicle. The method includes providing the refuse vehicle including a chassis supporting a plurality of wheels, a vehicle body supported by the chassis and defining a receptacle for storing refuse therein, a lifting system coupled to the vehicle body and movable relative to the receptacle, wherein the lifting system is configured to lift a refuse container and empty refuse in the refuse container into the receptacle, and at least one sensor configured to detect the thermal event. The method further includes detecting, with the at least one sensor, the thermal event, and shutting down the lifting system in response to detecting the thermal event.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
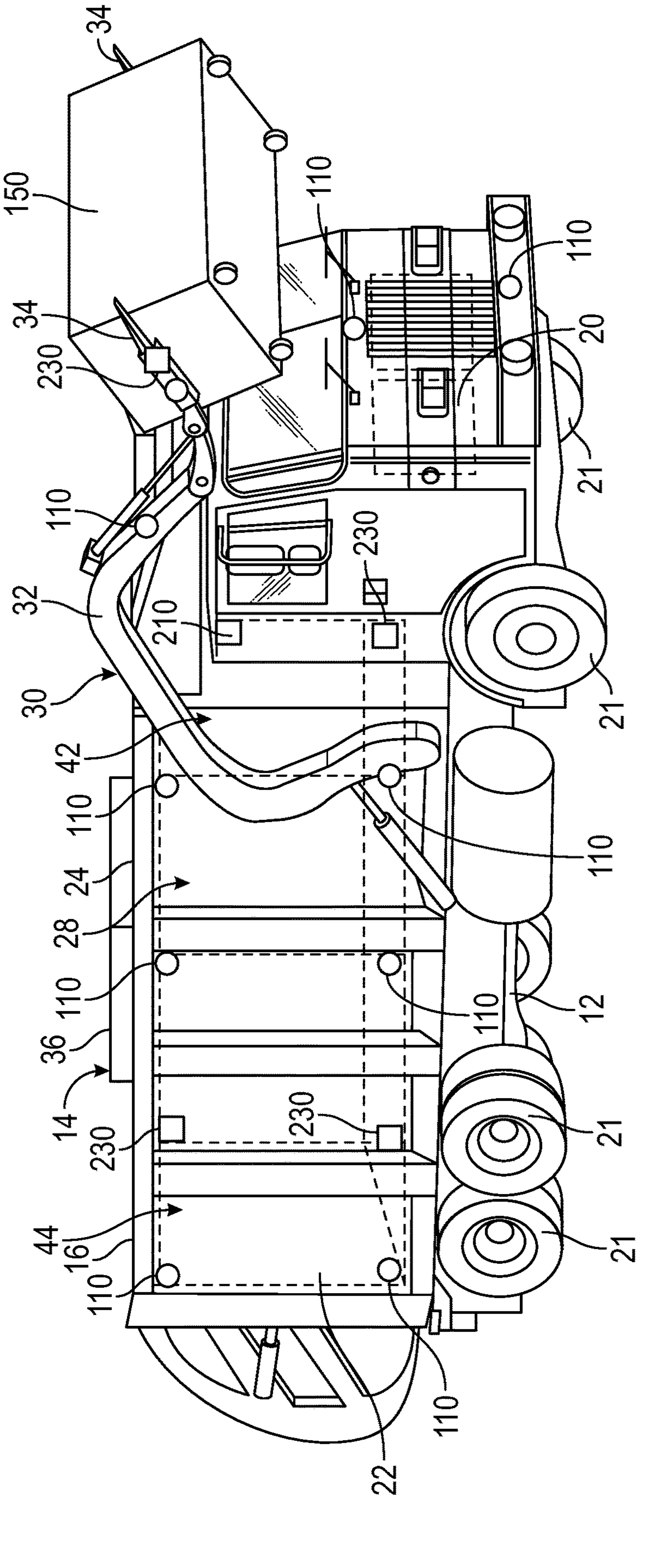
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for thermal detection, suppression, and discharge are disclosed. The systems, apparatuses, and methods disclosed herein involve a thermal event monitoring system. The thermal event monitoring system may be used to detect a thermal event (i.e., the amount of thermal energy detected is greater than a per-determined threshold)

when a refuse can is being grabbed by the refuse vehicle and when the refuse is being loaded into the hopper volume of the refuse vehicle. The thermal event monitoring system may also be used to isolate, inhibit, or otherwise reduce the changes of a thermal event spreading and increasing in severity. The thermal event monitoring system may also be used to discharge a flame retardant substance (e.g., gas, liquid, foam, etc.) to eliminate a thermal event.

As is described further herein, the thermal event monitoring system may monitor a body of a refuse vehicle and/or an environment of the refuse vehicle to detect thermal events (e.g., excess heat generation, flames, etc.). For example, the thermal event monitoring system may detect a thermal event in a refuse can while the refuse can is being grabbed by the refuse vehicle (e.g., by a lifting system), and the thermal event monitoring system may prevent the refuse can from being loaded into the hopper volume of the refuse vehicle in response to the thermal event being detected. In various embodiments, the thermal event monitoring system includes sensors (e.g., heat sensors, thermal imaging cameras, thermometers, spot heat detectors, linear heat detectors, etc.) positioned around a body of the refuse vehicle, including on the arm used to grab refuse cans so that the refuse in the refuse can may be loaded into the refuse vehicle. In some embodiments, the thermal event monitoring system further include an aspirating smoke detector. For example, the thermal event monitoring system may include various air sampling passages (e.g., tubes, pipes, etc.) configured to sample air from within a refuse compartment of the refuse vehicle and transport the air to an aspirating smoke detector for detection.

In various embodiments, some or all of the sensors of the thermal event monitoring system are positioned on an outside surface of the refuse vehicle body, thereby protecting the sensors from potentially damaging materials inside the refuse vehicle body (e.g., caustic refuse inside a refuse compartment, etc.). Additionally or alternatively, some or all of the sensors may be positioned on an inside surface of the refuse vehicle body. In various embodiments, the thermal event monitoring system facilitates alert generation. For example, in response to detecting a thermal event (e.g., a hot spot, excess heat, a flame, etc.), the thermal event monitoring system may display a graphic on a user interface. In some embodiments, the thermal event monitoring system may facilitate rerouting the refuse vehicle to a safe location. For example, in response to detecting a thermal event, the thermal event monitoring system may generate a navigational route for the refuse vehicle to direct the refuse vehicle to a service location. In some embodiments, the thermal event monitoring system facilitates alerting external systems. For example, in response to detecting a thermal event, the thermal event monitoring system may transmit a GPS location to a fleet management system. As an additional example, the thermal event monitoring system may also transmit a GPS location to an emergency response team (e.g., a 911 operator, etc.).

Figure 2:
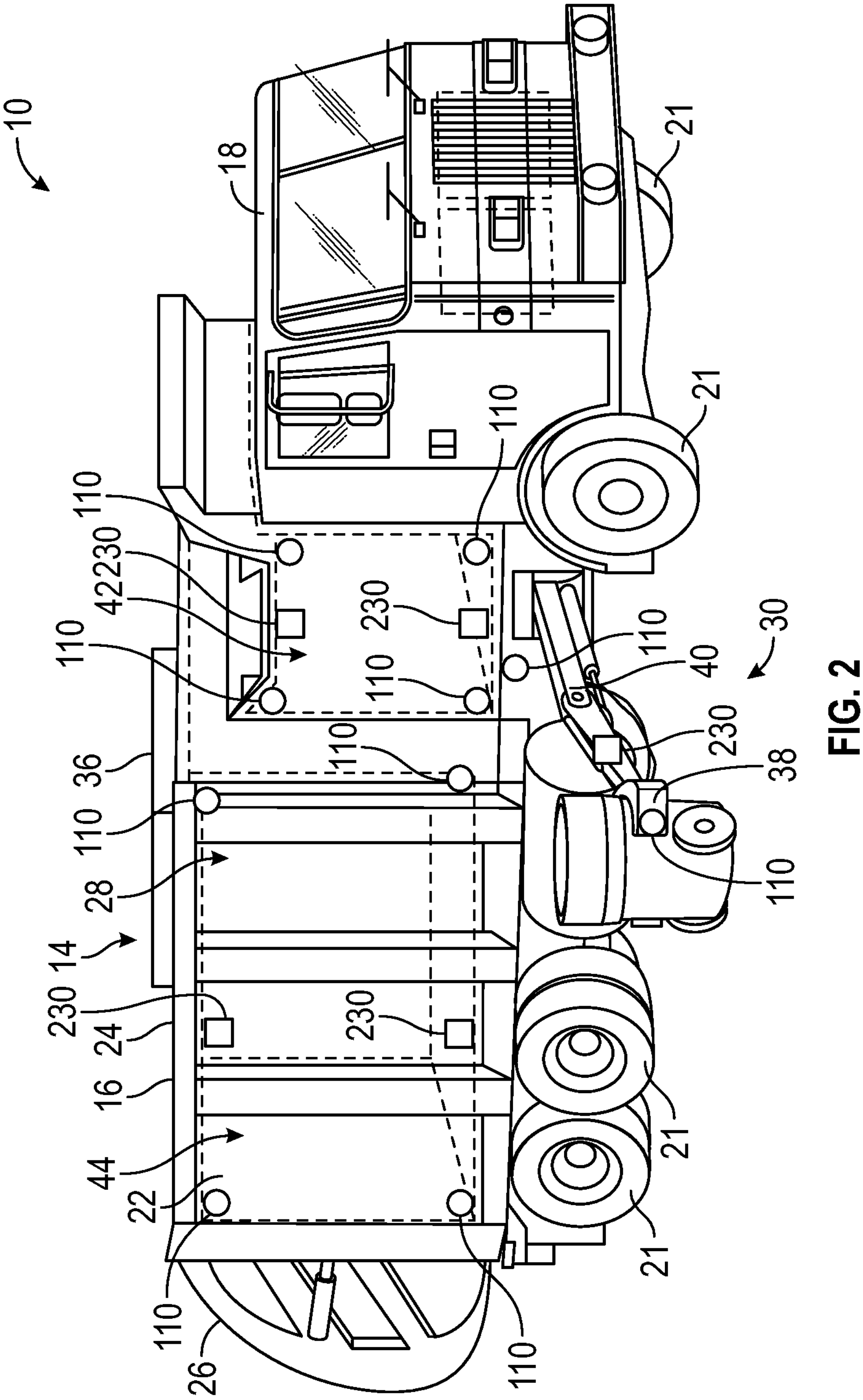
FIG. 2 is a perspective view of a side loading refuse vehicle according to an exemplary embodiment.
Figure 3:
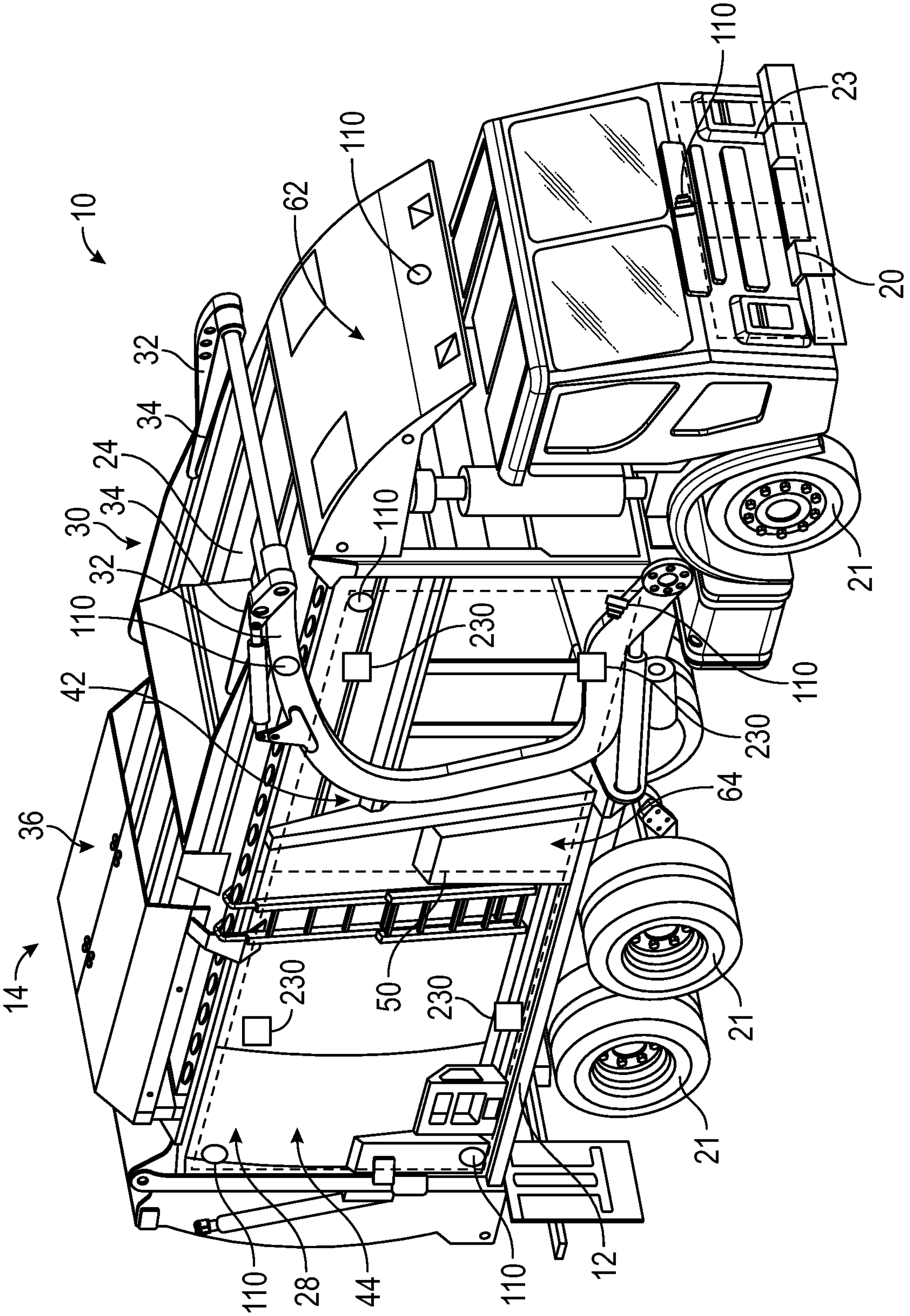
FIG. 3 is a front perspective view of an electric front loading refuse vehicle according to an exemplary embodiment.

Referring to FIGS. 1-3, a vehicle, shown as refuse vehicle 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processing units, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultracapacitors, etc.), from an on-board generator (e.g., an internal combustion engine), or from an external power source (e.g., overhead power lines) and provide power to the systems of the refuse vehicle 10.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-3, the on-board receptacle 16 and collection chamber 28 are each positioned behind the cab 18. In some embodiments, the collection chamber 28 includes a hopper volume 42 and a storage volume 44. Refuse is initially loaded into the hopper volume 42 and thereafter compacted into the storage volume 44. According to an exemplary embodiment, the hopper volume 42 is positioned between the storage volume and the cab 18 (i.e., refuse is loaded into a position behind the cab 18 and stored in a position further toward the rear of the refuse vehicle 10).

As shown in FIGS. 1-3, the refuse vehicle 10 including a thermal event monitoring system (e.g., the thermal event monitoring system 300 described herein) is shown, according to an exemplary embodiment. In should be understood that while the thermal event monitoring system of the present disclosure is described in relation to refuse vehicle 10 it is also usable with other vehicles (e.g., trucks, semi-trailers, construction equipment, etc.). In various embodiments, refuse vehicle 10 equipped with the thermal event monitoring system includes sensor(s) 110. Sensor(s) 110 may include heat detectors, flame detectors, linear heat detectors, aspirating smoke detector, thermal imaging devices, a photoelectric device, and/or the like. In some embodiments, sensor(s) 110 includes an image capture device. For example, sensor(s) 110 may include a video camera with thermal imaging capabilities and associated software components for identifying a thermal event in an image of the video camera. In various embodiments, sensor(s) 110 are positioned around body 14 of refuse vehicle 10. For example, sensor(s) 110 may be positioned on an outside surface of the refuse collection chamber 28. In some embodiments, sensor(s) 110 are positioned along the arms 32 and/or the forks 34. In some embodiments, sensor(s) 110 may be positioned in a wheel well or engine compartment of refuse vehicle 10. In various embodiments, sensor(s) 110 are positioned as to be safe from damage. For example, sensor(s) 110 may be positioned inside of refuse collection chamber 28 but away from refuse that might damage sensor(s) 110. In some embodiments, sensor(s) 110 include protective elements. For example, sensor(s) 110 may include a protective housing to protect sensor(s) 110 from caustic refuse in the refuse collection chamber 28.

In certain embodiments, some or all of the sensor(s) 110 may be positioned such that the sensor(s) can detect a thermal event in the refuse container 150 that is being grabbed by the refuse vehicle 10. For example, sensor(s) 110 may be located on the arms 32 and/or forks 34. Further, sensor(s) 110 may be located near the front of the refuse vehicle 10 if the refuse vehicle 10 is a front loading refuse vehicle 10. The sensor(s) 110 may be located on the side of the refuse vehicle 10 if the refuse vehicle 10 is a side loading refuse vehicle 10. The sensor(s) 110 may be located near the rear of the refuse vehicle 10 if the refuse vehicle 10 is a rear loading refuse vehicle 10.

In certain embodiments, the sensor(s) 110 may detect a thermal event within the refuse container 150. For example, sensors 110 located on the arms 32, forks 34, or otherwise positioned to detect a thermal event within the refuse container 150 may detect a thermal event when the lifting system 30 is lifting a refuse can 150. In response, the lifting system 30 may be shut off, thereby preventing thermal event from being spread to the hopper volume 42.

As will be discussed in further detail, as shown in FIGS. 1-3, the refuse vehicle 10 includes thermal suppression component(s) 230. In various embodiments, the thermal event monitoring system may be configured to operate the thermal suppression component(s) 230. For example, the thermal event monitoring system may detect the presence of a thermal event (e.g., via sensor(s) 110, etc.) and may operate the thermal suppression component 230 to nullify the thermal event (e.g., spray water on a flame, etc.). The thermal suppression component 230 may be a fire sprinkler, a gaseous agent dispenser, a chemical agent dispenser, a flame retardant substance dispenser, and/or the like. In various embodiments, the thermal suppression component 230 is positioned within refuse collection chamber 28, thereby facilitating thermal suppression associated with thermal events within refuse collection chamber 28. In certain embodiments, the lifting system 30 may include one or more thermal suppression components 230. For example, the one or more thermal suppression components 230 may be activated in response to a thermal event being detected in or near the refuse container 150.

Referring again to the exemplary embodiment shown in FIG. 1, the refuse vehicle 10 is a front-loading refuse vehicle. In other embodiments, the refuse vehicle 10 is a side-loading refuse vehicle. In still other embodiments, the refuse vehicle 10 is a rear-loading refuse vehicle. As shown in FIG. 1, the refuse vehicle 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container 150 (e.g., protrude through apertures within the refuse container 150, etc.). During operation of the refuse vehicle 10, the forks 34 are positioned to engage the refuse container 150 (e.g., the refuse vehicle 10 is driven into position until the forks 34 protrude through the apertures within the refuse container 150). As shown in FIG. 1, the arms 32 are rotated to lift the refuse container 150 over the cab 18. A second actuator (e.g., a hydraulic cylinder articulates the forks 34 to tip the refuse out of the container and into the hopper volume 42 of the collection chamber 28 through an opening in the cover 24. The actuator thereafter rotates the arms 32 to return the empty refuse container 150 to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse vehicle 10 is a side-loading refuse vehicle that includes a lifting system, shown as a grabber 38 that is configured to interface with (e.g., engage, wrap around, etc.) a refuse container 150 (e.g., a residential garbage can, a commercial sized dumpster, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder) articulates the arm 40 and positions the grabber 38 to interface with the refuse container 150. The arm 40 may be movable within one or more directions (e.g., up and down, left and right, in and out, rotation, etc.) to facilitate positioning the grabber 38 to interface with the refuse container 150. According to an alternative embodiment, the grabber 38 is movably coupled to the body 14 with a track. After interfacing with the refuse container 150, the grabber 38 is lifted up the track (e.g., with a cable, with a hydraulic cylinder, with a rotational actuator, etc.). The track may include a curved portion at an upper portion of the body 14 so that the grabber 38 and the refuse container 150 are tipped toward the hopper volume 42 of the collection chamber 28. In both embodiments, the grabber 38 and the refuse container 150 are tipped toward the hopper volume 42 of the collection chamber 28 (e.g., with an actuator, etc.). As the grabber 38 is tipped, refuse falls through an opening in the cover 24 and into the hopper volume 42 of the collection chamber 28. The arm 40 or the track then returns the empty refuse container 150 to the ground, and the top door 36 may be slid along the cover 24 to seal the opening thereby preventing refuse from escaping the collection chamber 28 (e.g., due to wind).

Referring to FIG. 3, the refuse vehicle 10 is a front loading E-refuse vehicle. Like the refuse vehicle 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container 150 (e.g., protrude through apertures within the refuse container 150, etc.). During operation of the refuse vehicle 10, the forks 34 are positioned to engage the refuse container 150 (e.g., the refuse vehicle 10 is driven into position until the forks 34 protrude through the apertures within the refuse container 150). A second actuator (e.g., a hydraulic cylinder) articulates the forks 34 to tip the refuse out of the container and into the hopper volume 42 of the collection chamber 28 through an opening in the cover 24. The actuator thereafter rotates the arms 32 to return the empty refuse container 150 to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse vehicle 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse vehicle 10, including additional electric motors, cab controls (e.g., climate controls, steering, lights, etc.), the lifting system 30, and/or a compactor 50, for example. In one embodiment, the refuse vehicle 10 is a rear-loading refuse vehicle, and the compactor 50 includes a slide and sweep packer disposed at the rear-end of the body.

Figure 4:
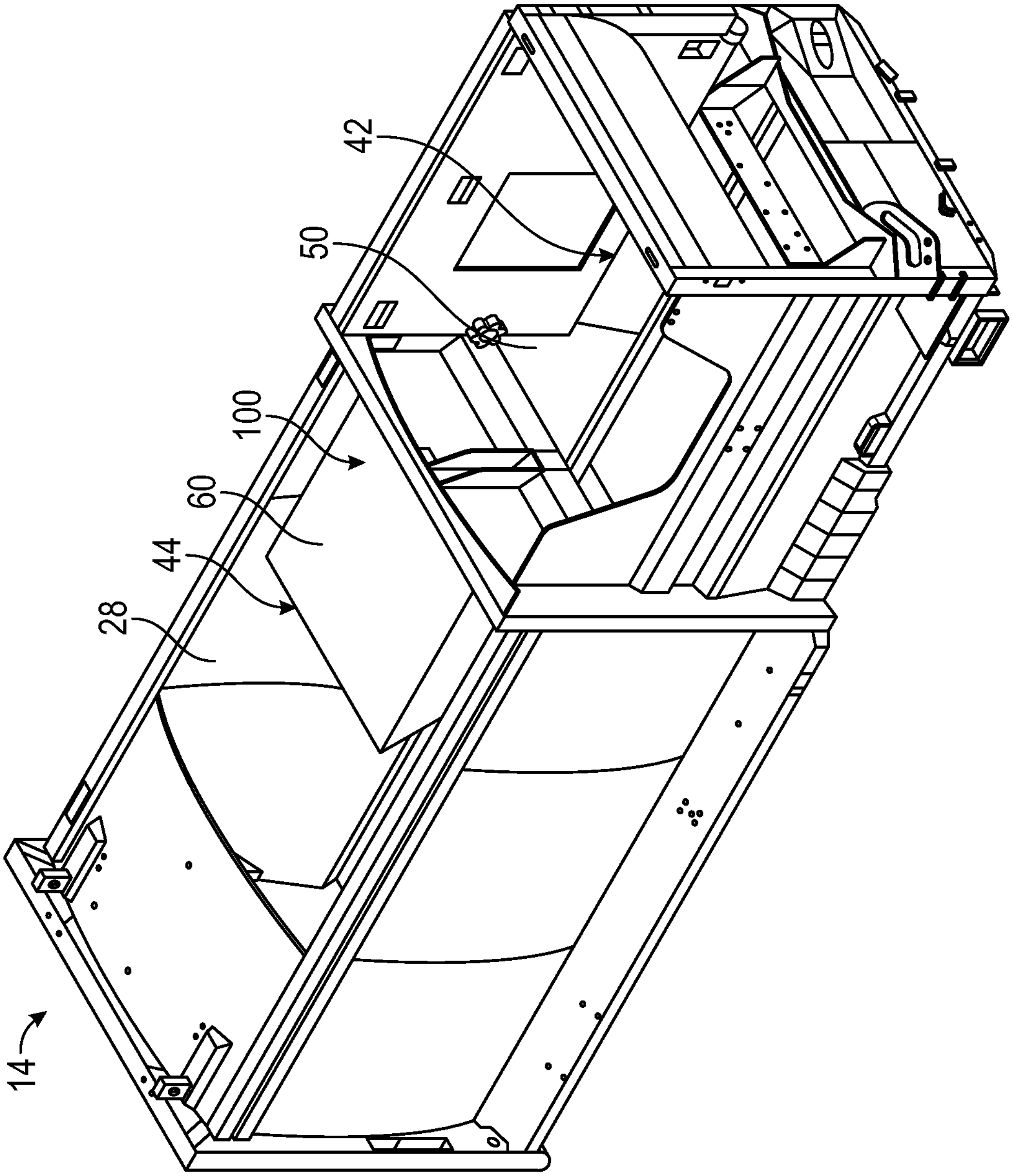
FIG. 4 is a top perspective view of a body assembly of the refuse vehicle of FIG. 3, according to an exemplary embodiment.

The refuse vehicle 10 can be considered a hybrid refuse vehicle as it includes both electric and hydraulic power systems. As depicted in FIGS. 3-4, the refuse vehicle 10 includes an E-PTO system 100. The E-PTO system 100 is configured to receive electrical power from the batteries 23 and convert the electrical power to hydraulic power. In some examples, the E-PTO system 100 includes an electric motor driving a hydraulic pump 102. The hydraulic pump 102 pressurized hydraulic fluid onboard the refuse vehicle 10, which can then be supplied to various hydraulic cylinders and actuators present on the refuse vehicle 10. For example, the hydraulic pump 102 can provide pressurized hydraulic fluid to each of the hydraulic cylinders within the lift system 30 on the refuse vehicle. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 100 can be positioned about the refuse vehicle 10 in various different places. For example, the E-PTO system 100 may be positioned within a housing 60 above or within the on-board receptacle 16 (see FIG. 4), beneath a canopy 62 extending over a portion of the cab 18, or alongside the vehicle body 14. Although the E-PTO system 100 may be in electrical communication with the batteries 23, the E-PTO system 100 can be separate from and spaced apart from the vehicle frame 12.

Figure 5:
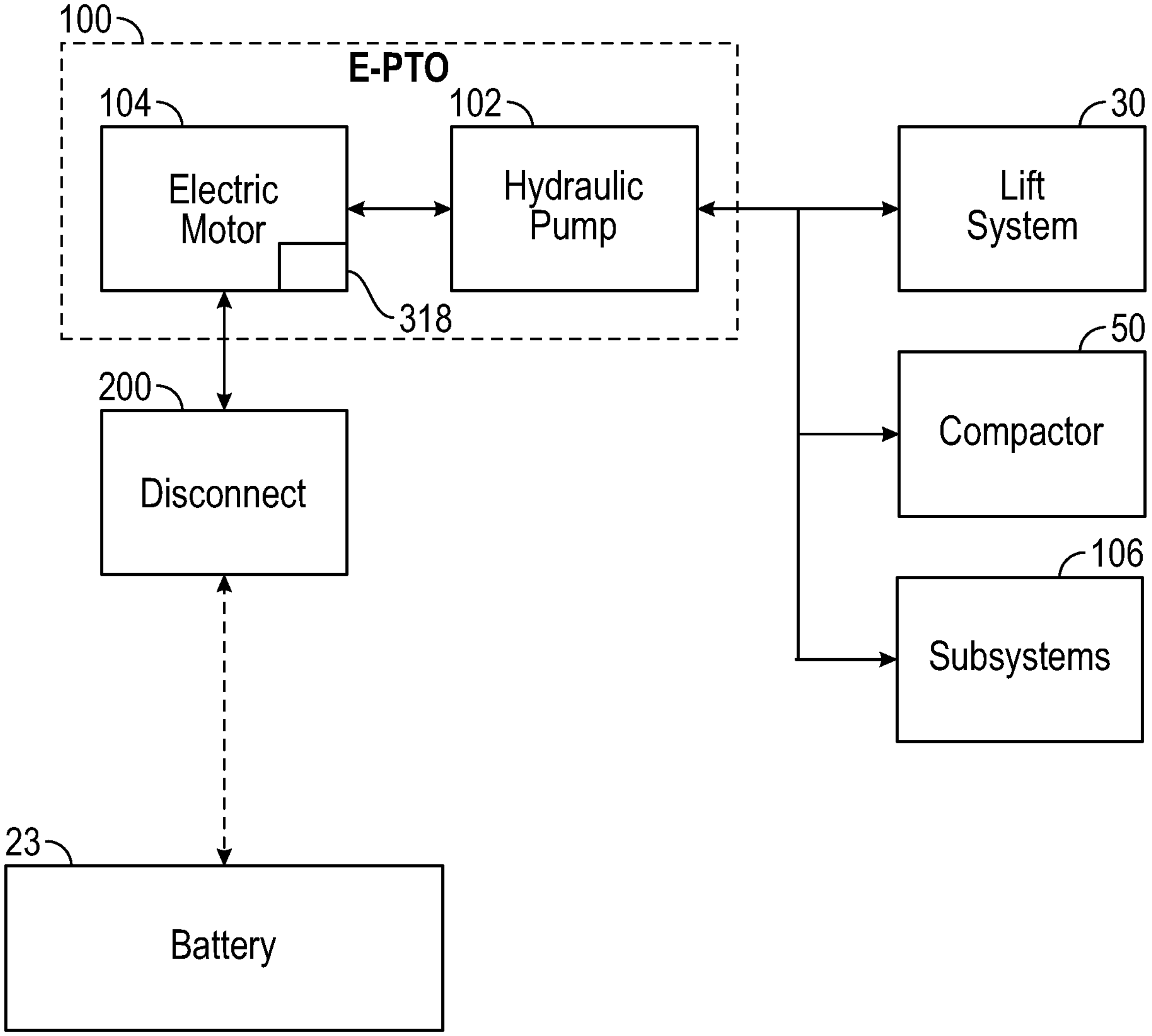
FIG. 5 is a schematic view of a control system of the refuse vehicle of FIG. 3.

With additional reference to FIG. 5, the refuse vehicle 10 includes a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to the electric motor 104. Without electrical power from the batteries 23, the electric motor 104 will not drive the hydraulic pump 102. Pressure within the hydraulic system will gradually decrease, such that none of the lifting system 30, compactor 50, or vehicle subsystems 106 relying upon hydraulic power will be functional. The refuse vehicle 10 can then be operated in a lower power consumption mode, given the reduced electrical load required from the batteries 23 to operate the refuse vehicle 10. The disconnect 200 further enables the refuse vehicle 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain optional even when the E-PTO system 100 is not receiving electrical power from the batteries 23.

Figure 6:
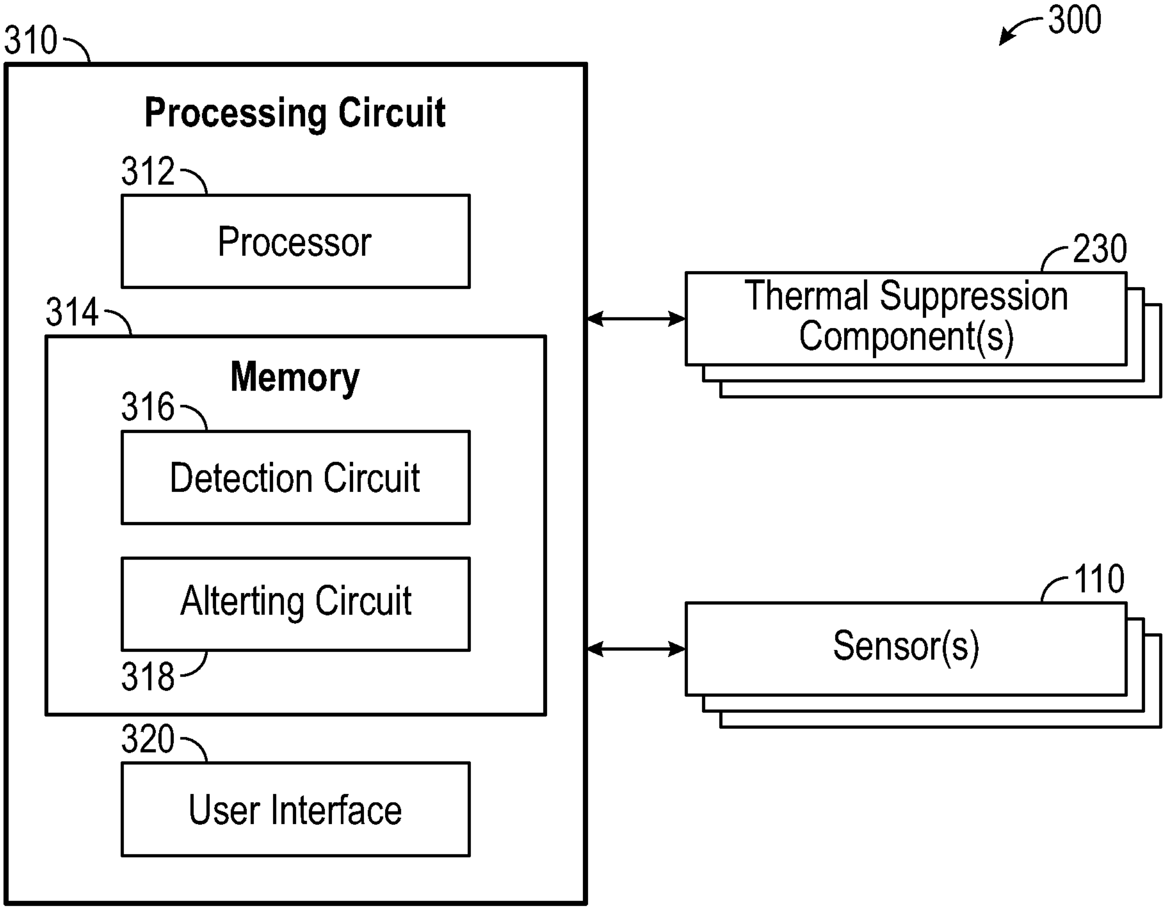
FIG. 6 is a schematic view of a thermal event monitoring system according to an exemplary embodiment.
Figure 7:
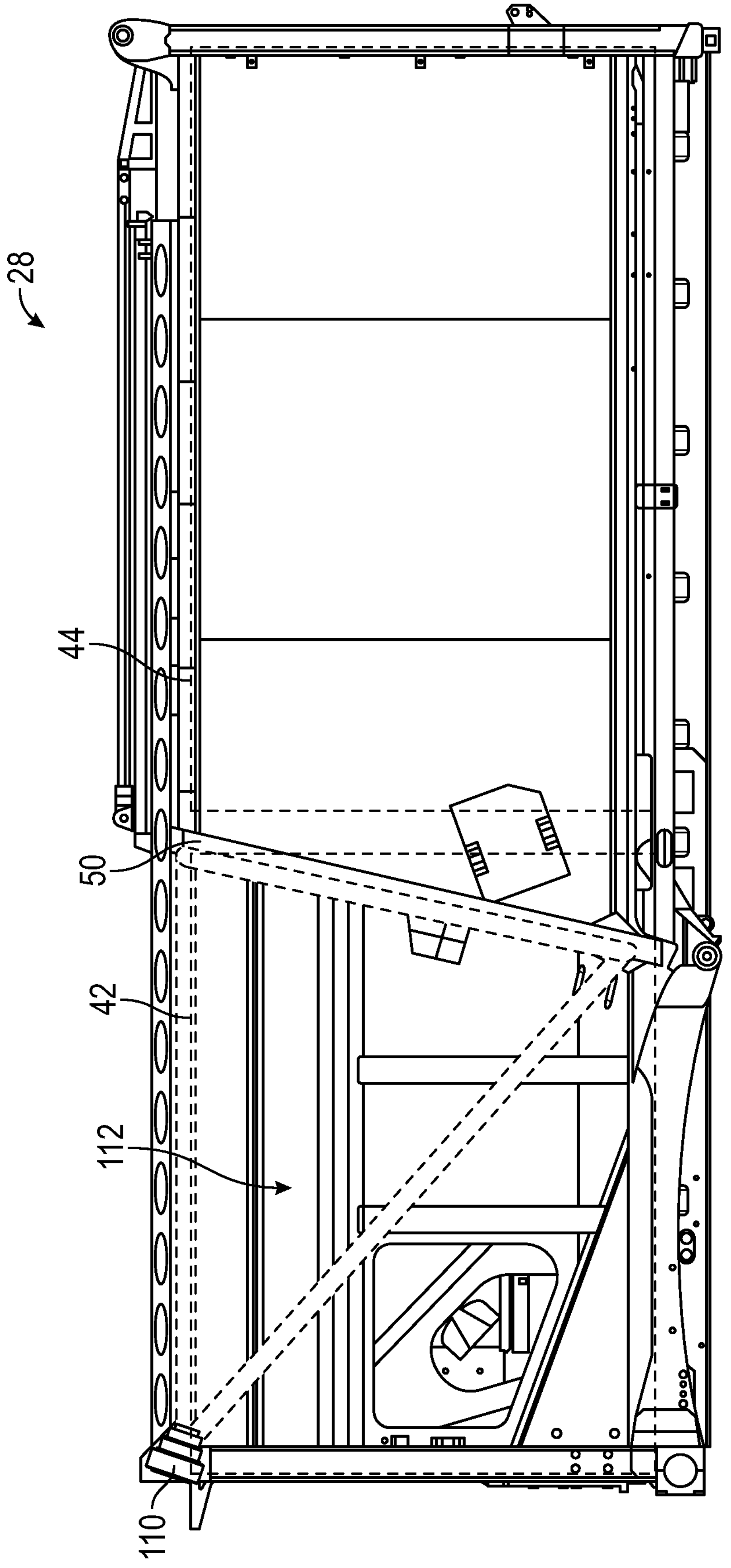
FIG. 7 is a side view of a collection chamber according to an exemplary embodiment.
Figure 8:
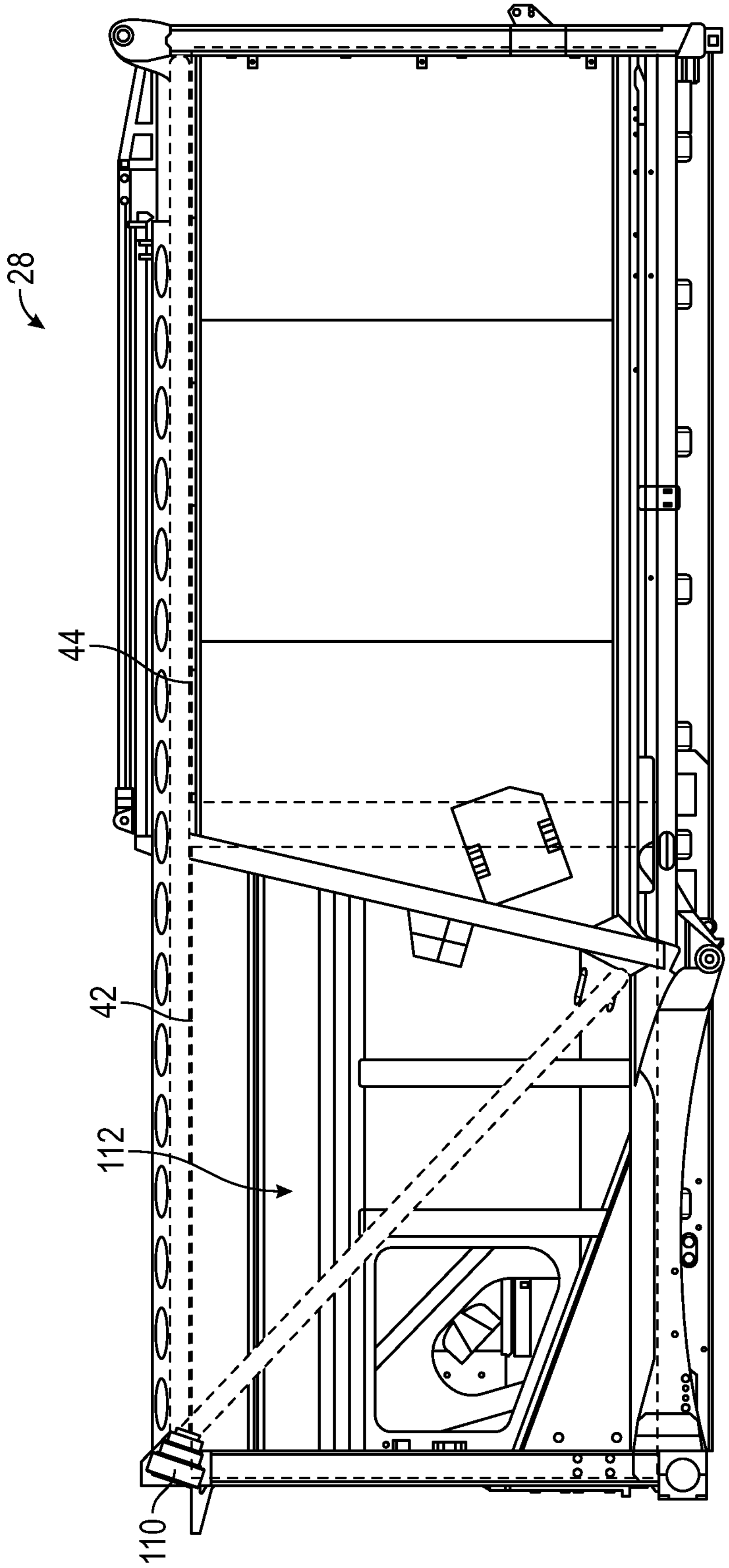
FIG. 8 is a side view of another collection chamber according to an exemplary embodiment.
Figure 9:
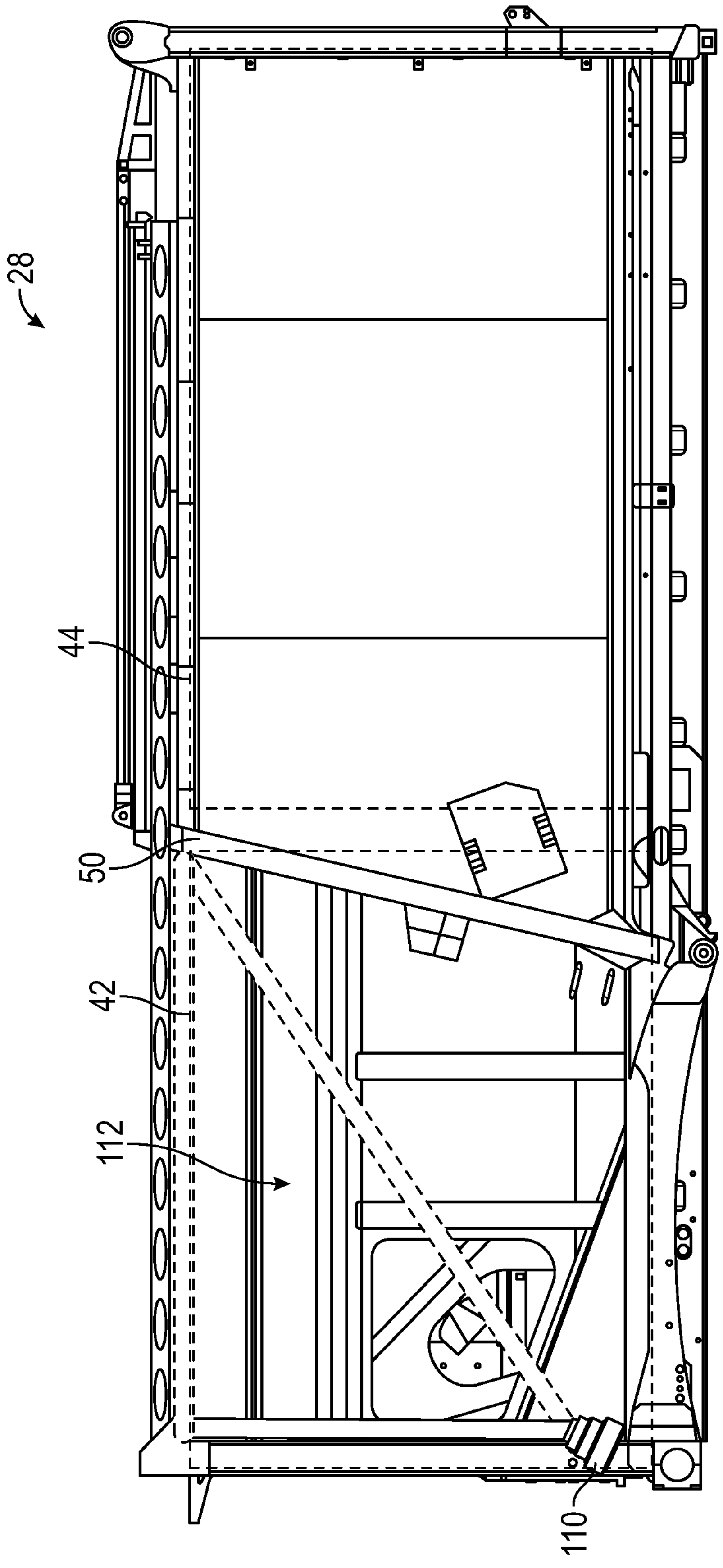
FIG. 9 is a side view of another collection chamber according to an exemplary embodiment.
Figure 10:
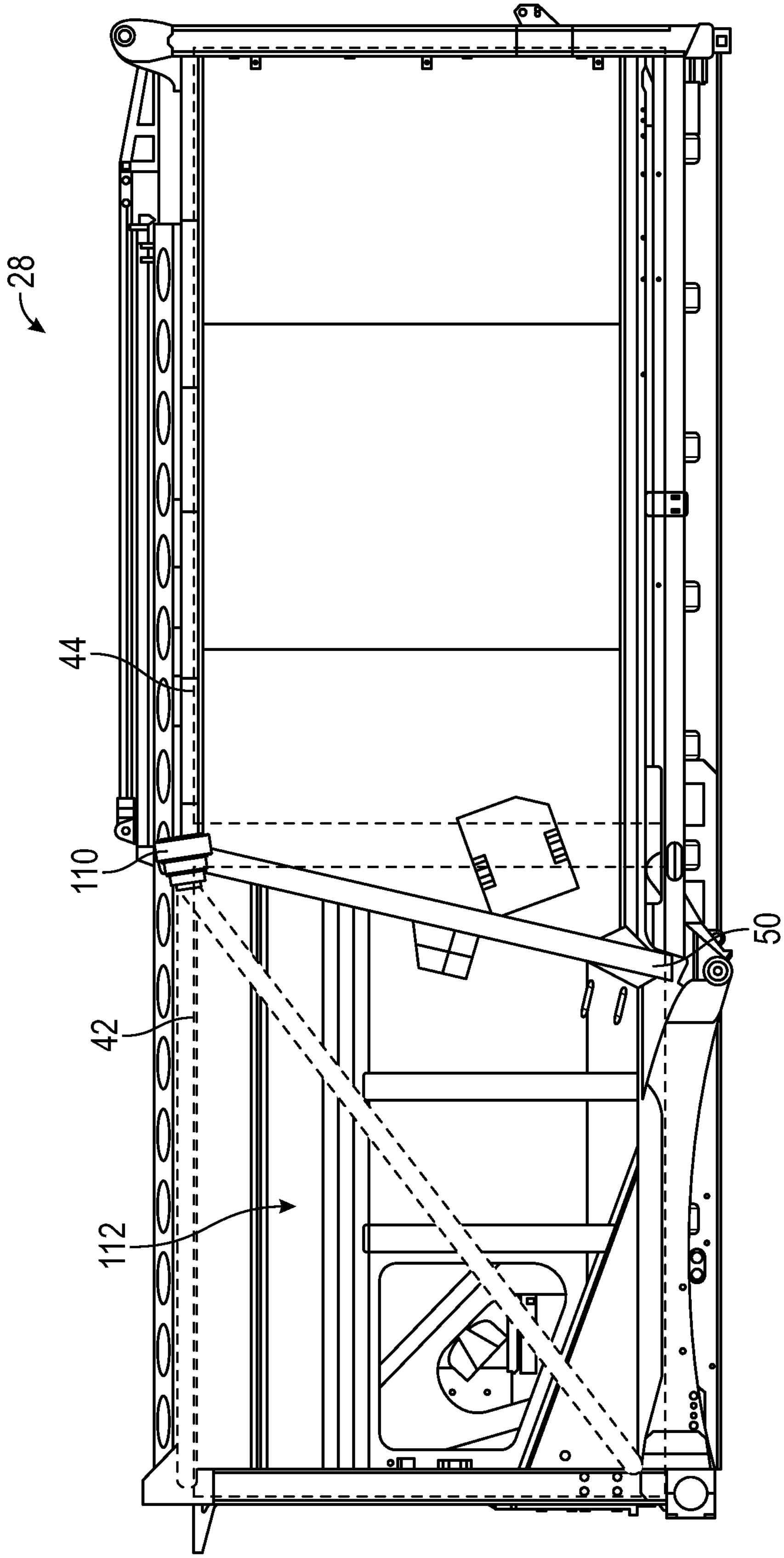
FIG. 10 is a side view of another collection chamber according to an exemplary embodiment.
Figure 11:
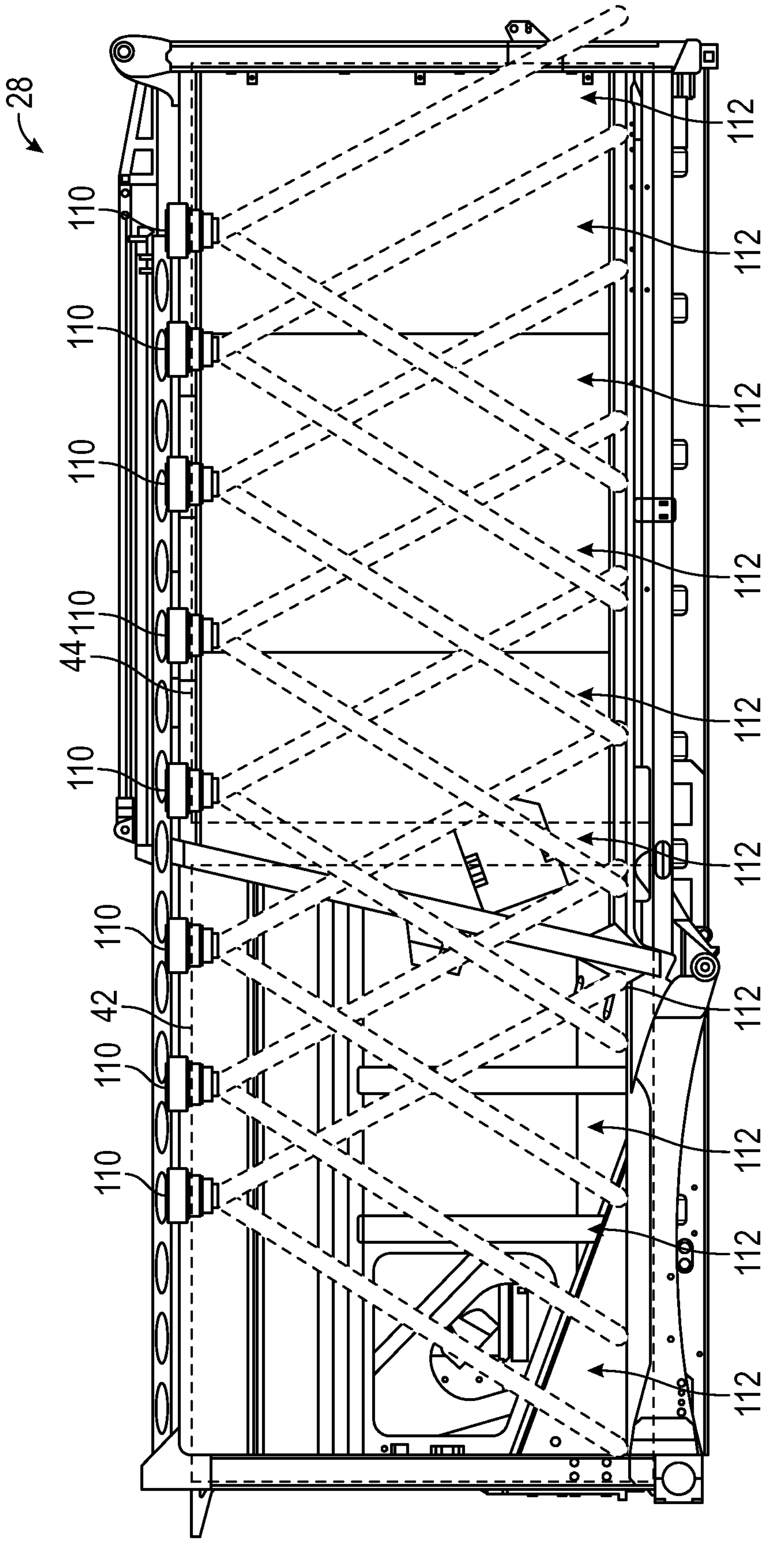
FIG. 11 is a side view of another collection chamber according to an exemplary embodiment.

Referring now to FIG. 6, a thermal event monitoring system 300 is shown according to an example embodiment. The thermal event monitoring system 300 is shown to include a processing circuit 310 and a user interface 320. The processing circuit 310 (e.g., a controller) may include a processor 312 and a memory 314. The processor 312 may be coupled to the memory 314. The processor 312 may be a general purpose or specific purpose processor, an application specific integrated circuit (ASIC), one or more field programmable gate arrays (FPGAs), a group of processing components, or other suitable processing components. The processor 312 is configured to execute computer code or instructions stored in the memory 314 or received from other computer readable media (e.g., CDROM, network storage, a remote server, etc.).

The memory 314 may include one or more devices (e.g., memory units, memory devices, storage devices, etc.) for storing data and/or computer code for completing and/or facilitating the various processes described in the present disclosure. The memory 314 may include random access memory (RAM), read-only memory (ROM), hard drive storage, temporary storage, non-volatile memory, flash memory, optical memory, or any other suitable memory for storing software objects and/or computer instructions. The memory 314 may include database components, object code components, script components, or any other type of information structure for supporting the various activities and information structures described in the present disclosure. The memory 314 may be communicably connected to processor 312 via the processing circuit 310 and may include computer code for executing (e.g., by the processor 312) one or more of the processes described herein.

The detection circuit 316 is configured to receive signals from sensor(s) 110 and to determine the presence of a thermal event. A thermal event may include a fire, excess heat (e.g., an amount of heat above what would be expected for an area given the context, etc.), smoke, flames, and/or the like. In some embodiments, the detection circuit 316 determines a thermal event using an algorithm. For example, detection circuit 316 may determine a thermal event using a rate-of-rise algorithm. Additionally or alternatively, detection circuit 316 may determine a thermal event using a pre-determined threshold (i.e., the amount of thermal energy detected is greater than a first threshold). For example, detection circuit 316 may determine the presence of a thermal event if a temperature of the refuse container 150, the refuse collection chamber 28, or a region thereof, exceeds a threshold temperature (e.g., as sensed by sensor(s) 110, etc.). In some embodiments, the detection circuit 316 determines a location of a thermal event. For example, the detection circuit 316 may determine a thermal event is located in a rear left portion of refuse collection chamber 28. In some embodiments, the detection circuit 316 classifies thermal events (e.g., high risk, medium risk, or low risk). In various embodiments, in response to determining a thermal event, detection circuit 316 transmits an indication of the thermal event to the alerting circuit 318.

The alerting circuit 318 is configured to perform one or more operations in response to receiving an indication of a thermal event. In some embodiments, the alerting circuit 318 presents an indication of the thermal event to an operator of refuse vehicle 10. For example, the alerting circuit 318 may control the user interface 320 to display a warning to an operator of refuse vehicle 10. In some embodiments, the alerting circuit 318 operates the refuse vehicle 10. For example, the alerting circuit 318 may operate a packer of the tailgate 26 to smother a fire inside of refuse collection chamber 28. In some embodiments, alerting circuit 318 may send signals to the thermal suppression component(s) 230 to suppress the thermal event. For example, alerting circuit 318 may cause the suppression component(s) 230 to suppress a fire inside of refuse collection chamber 28. In some example embodiments, if the alerting circuit 318 determines that a thermal event has occurred in or in the general proximity of the refuse container 150 (i.e., as detected by the sensor(s) 110), the alerting circuit 318 may cease operation of the lifting system 30, thereby preventing the thermal event from spreading to the collection chamber 28. In some example embodiments, as will be discussed further herein, the alerting circuit 318 may seal off the hopper volume 42 in response to determine a thermal event has occurred (i.e., as detected by the sensor(s) 110) in the hopper volume 42, thereby preventing the thermal event from spreading to the storage volume 44. Additionally or alternatively, the alerting circuit 318 may transmit one or more notifications. For example, the alerting circuit 318 may transmit a notification of the thermal event and associated information (e.g., a location of the refuse vehicle 10, etc.) to a fleet management system. As an additional example, the alerting circuit 318 may transmit a notification of the thermal event and associated information to an emergency response team (e.g., a 911 operator, etc.). Additionally or alternatively, the alerting circuit 318 may reroute the refuse vehicle 10. For example, in the case of a fully-autonomous refuse vehicle, the alerting circuit 318 may reroute the refuse vehicle 10 to a safe location (e.g., a service location, a fire station, away from a densely populated area, etc.). As a further example, the alerting circuit 318 may notify an operator of refuse the vehicle 10 of the thermal event and may generate a GPS route to a safe location for the operator.

The user interface 320 is configured to present information to and receive information from a user. In some embodiments, the user interface 320 includes a display device (e.g., a monitor, a touchscreen, etc.). In some embodiments, the user interface 320 includes an audio device (e.g., a microphone, a speaker, etc.). In various embodiments, the user interface 320 receives alerts from the alerting circuit 318 and presents the alerts to an operator of the refuse vehicle 10. For example, the user interface 320 may receive a visual alert from the alerting circuit 318 and display a graphic on a display device to alert an operator of the refuse vehicle 10 of a thermal event associated with the refuse vehicle 10.

Referring now to FIGS. 7-11, a side view of the collection chamber 28 is shown according to several example embodiments. The collection chamber 28 includes a hopper volume 42 and a storage volume 44. In certain embodiments, the hopper volume 42 and the storage volume 44 are separated by the compactor 50 and/or some other patrician. In some embodiments, the compactor 50 and/or patrician is movable between an open and closed position such that the hopper volume 42 is in fluid communication with the storage volume 44 in the open position and the hopper volume 42 is isolated from the storage volume 44 in the closed position.

As shown in FIGS. 7-12, various potential positions of sensor(s) 110 are shown. Each sensor 110 (e.g., thermal imaging devices) has a field of view (FOV) 112 (represented by the solid bold lines) depending on the orientation of the sensor 110. Further, the FOV 112 of each senor may be further limited if the compactor 50 and/or patrician is in the closed position (e.g., FIG. 7) compared to when the compactor 50 and/or patrician is in the open position (e.g., FIG. 8). In certain embodiments, such as the embodiments shown in FIG. 11, multiple sensors 110 may be located within the collection chamber 28.

Figure 12:
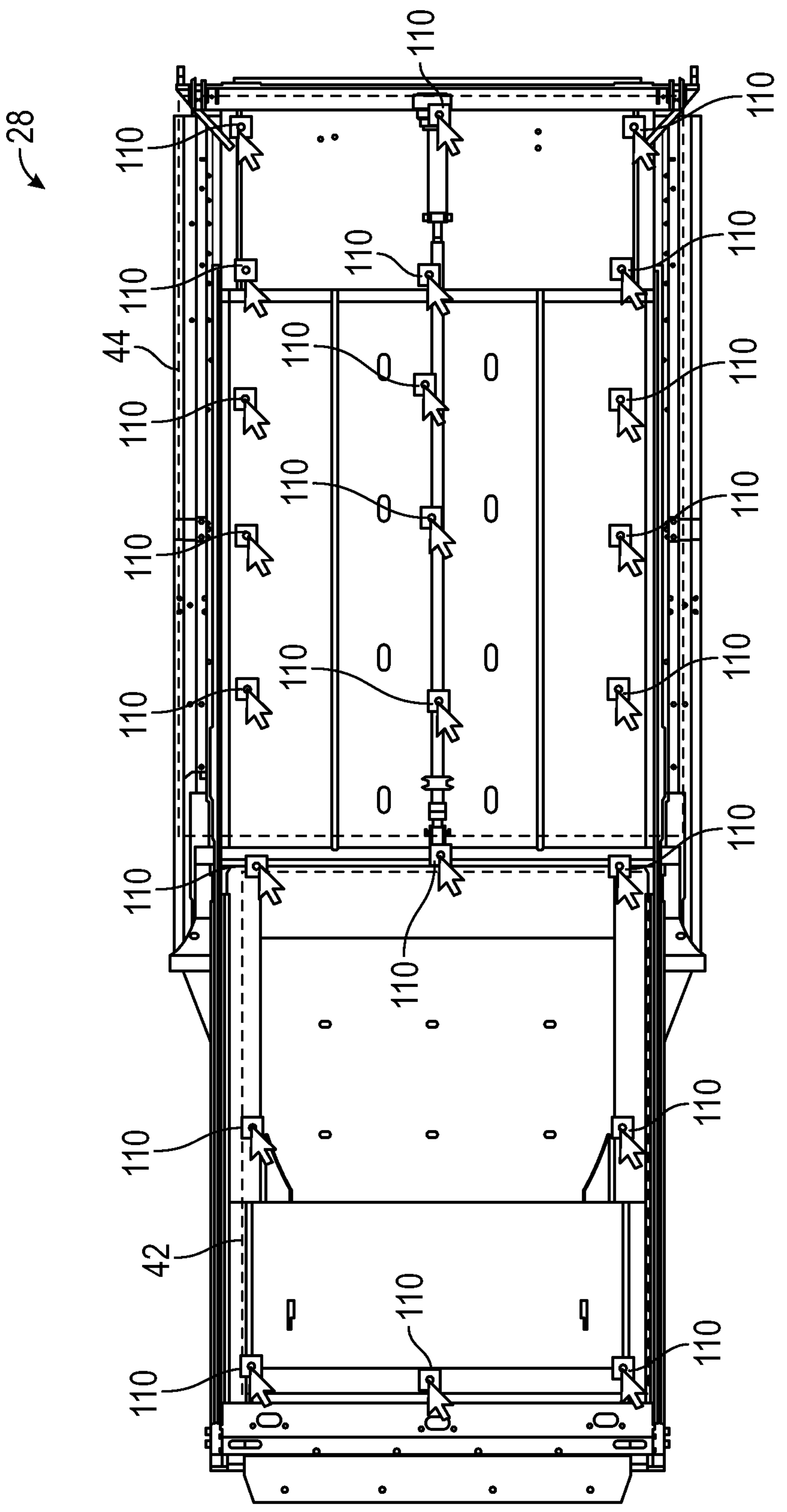
FIG. 12 is a top view of a collection chamber according to an exemplary embodiment.

Referring now to FIG. 12, a top view of the collection chamber 28 is shown according to an example embodiment. FIG. 12 depicts potential locations for sensors 110. By including multiple sensors 110, the thermal event monitoring system 300 may more accurately pinpoint the location of the thermal event and the thermal event monitoring system 300 may include several redundancies in the event that a sensor 110 fails, which may be detected by the thermal event monitoring system 300.

Figure 13:
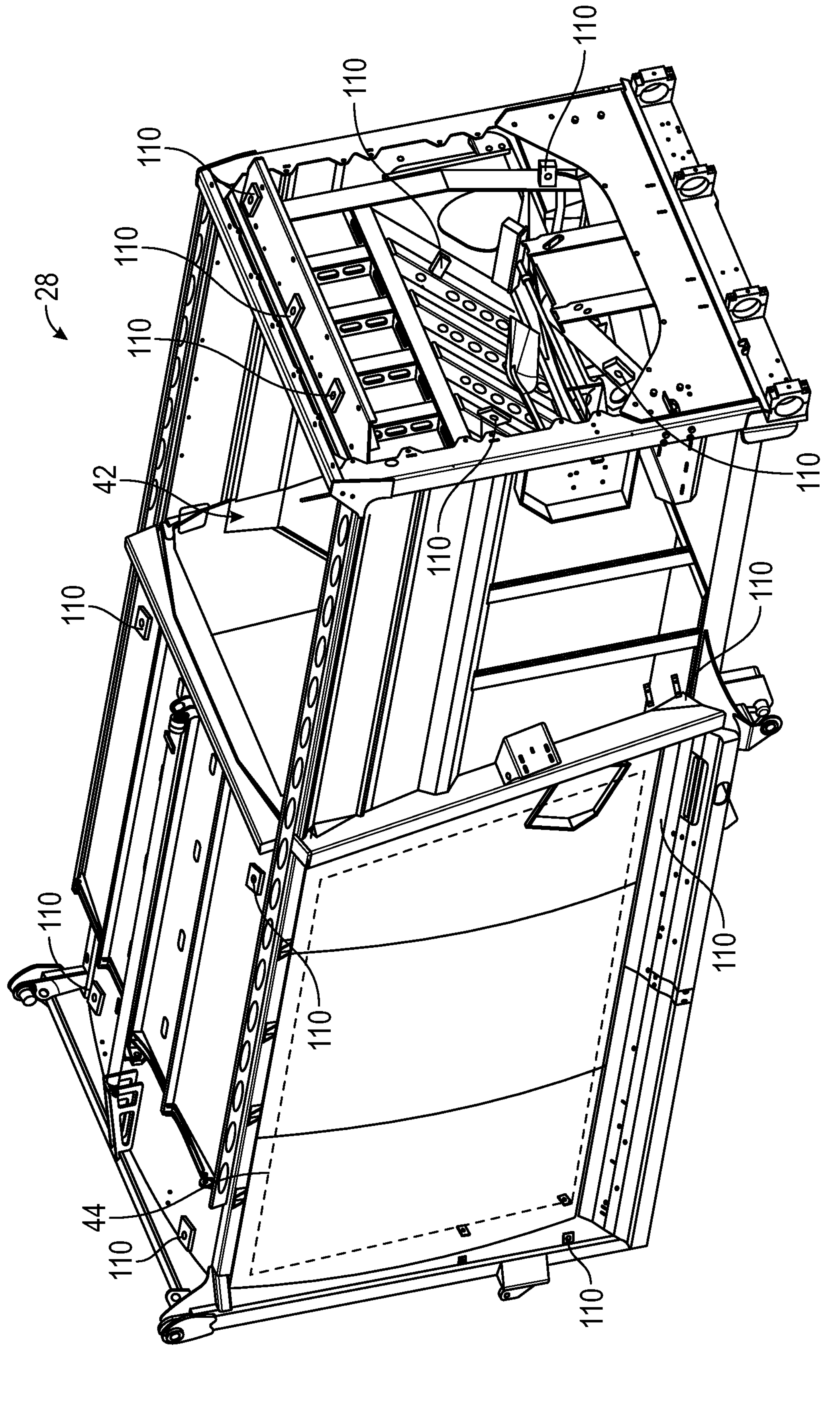
FIG. 13 is a perspective view of a collection chamber according to an exemplary embodiment.
Figure 14:
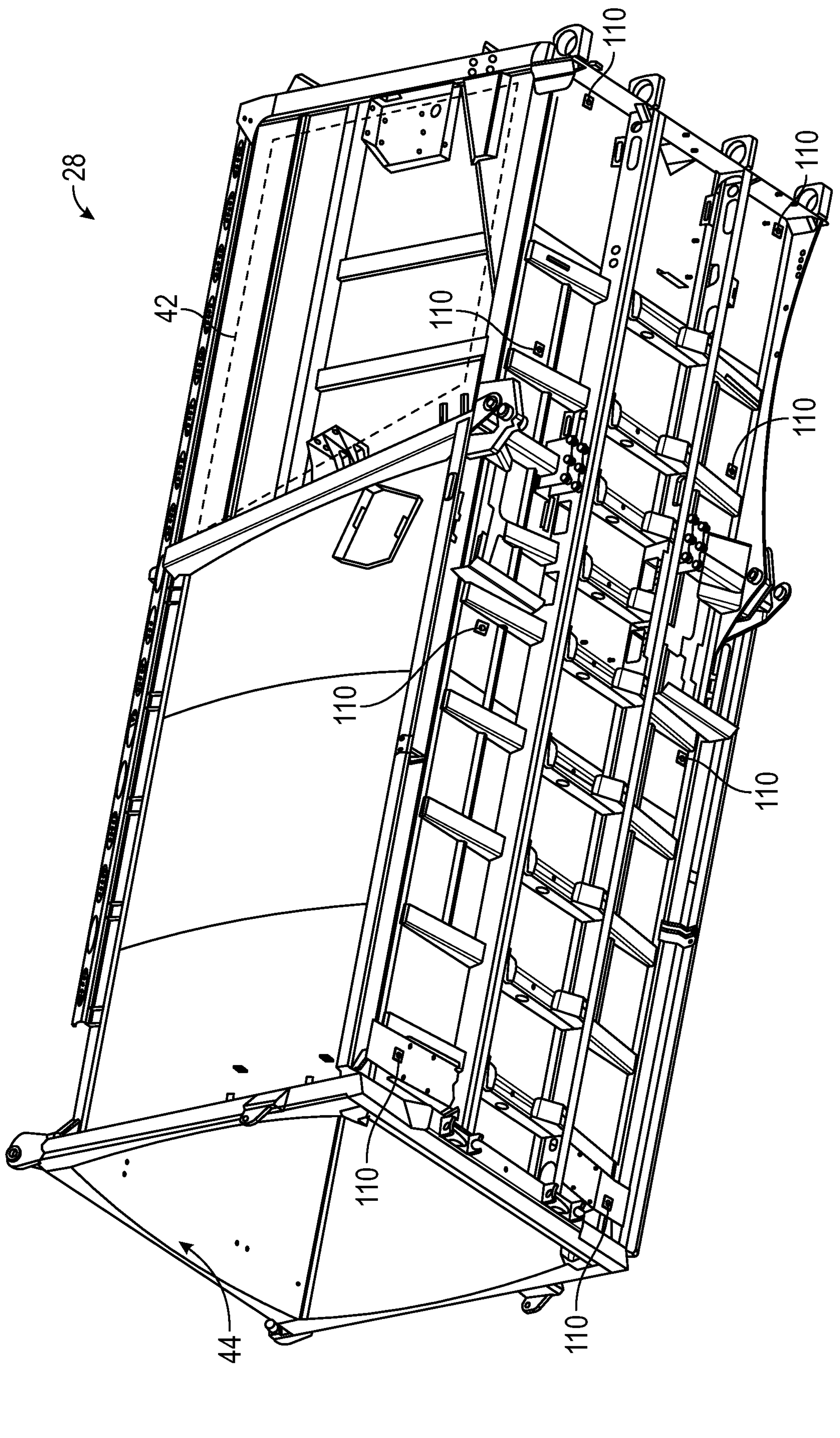
FIG. 14 is a perspective view of the collection chamber of FIG. 13 according to an exemplary embodiment.

Referring now to FIGS. 13 and 14, a perspective view of a collection chamber 28 is shown according to example embodiments. As shown, the collection chamber 28 shows potential locations for sensors 110 (e.g., thermal sensors). In certain example embodiments, the sensors 110 may be located on the outside of the collection chamber 28. In these example embodiments, the sensors 110 may be protected from the refuse and/or a thermal event that may occur within the collection chamber 28 while still being able to detect a thermal event (e.g., by detecting the heat that is conducted by the collection chamber 28).

Figure 15:
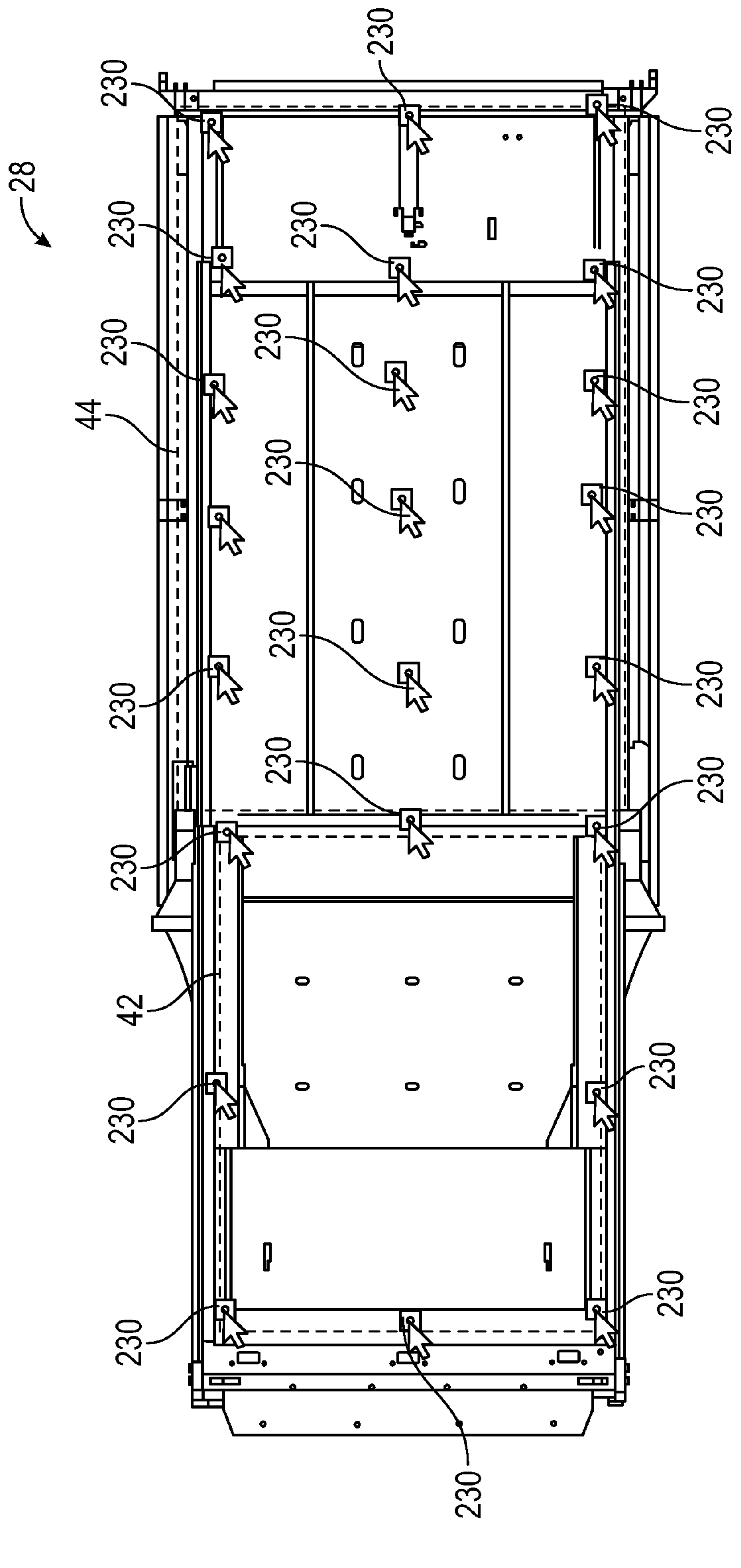
FIG. 15 is a top view of another collection chamber according to an exemplary embodiment.

Referring now to FIG. 15, a top view of a collection chamber 15 is shown according to an example embodiment. FIG. 15 depicts potential locations for thermal suppression components 230. For example, some thermal suppression components 230 may be configured to suppress a thermal event in the hopper volume 42 in response to a thermal event being detected (i.e., via a sensor 110) in the hopper volume 42. Some thermal suppression components 230 may be configured to suppress a thermal event in the storage volume 44 in response to a thermal event being detected (i.e., via a sensor 110) in the storage volume 44. By including multiple thermal suppression components 230, the thermal event monitoring system 300 may suppress a thermal event at a faster rate than just one thermal suppression component 230 and the thermal event monitoring system 300 may include several redundancies in the event that a thermal suppression component 230 fails, which may be detected by the thermal event monitoring system 300.

Figure 16:
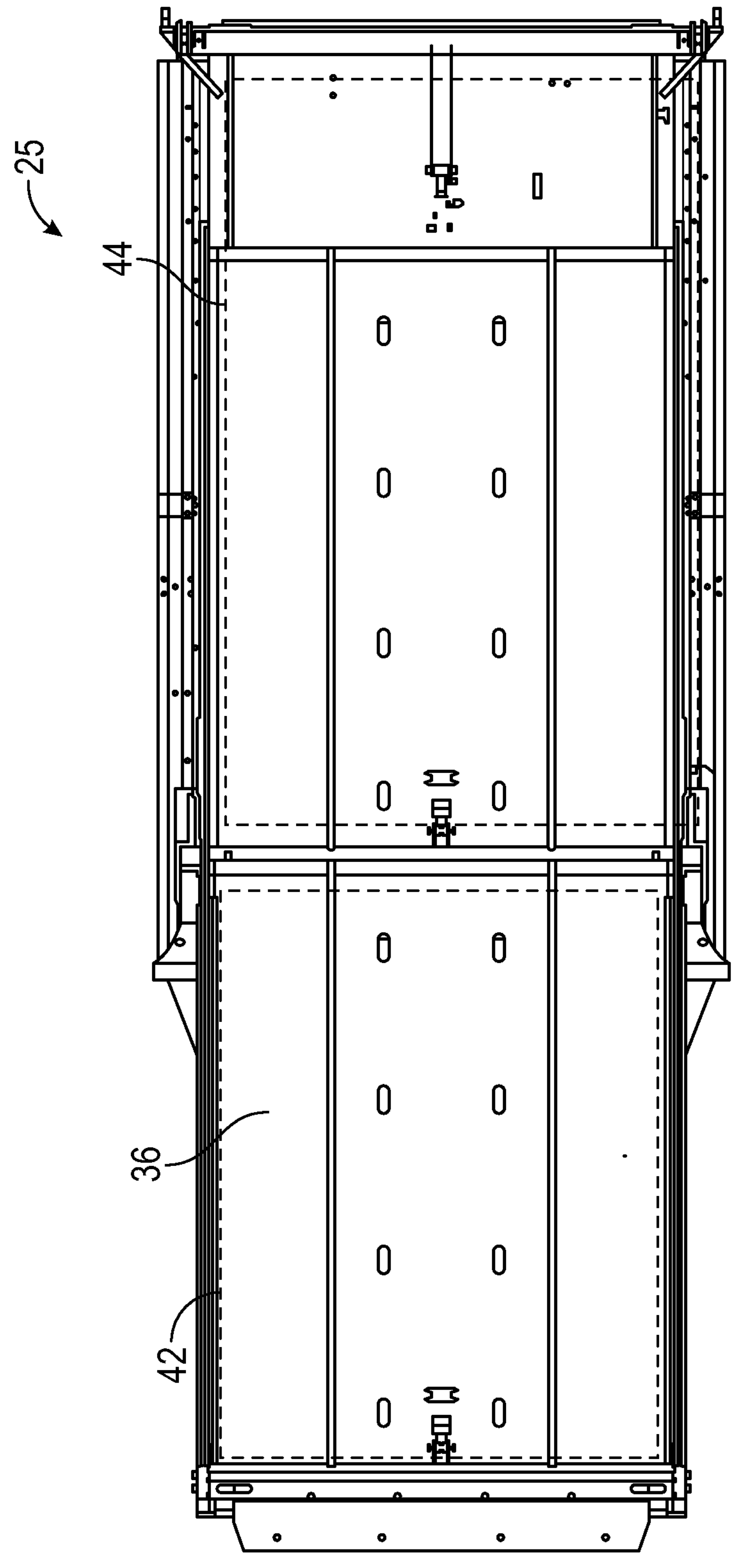
FIG. 16 is a top view of another collection chamber according to an exemplary embodiment.

Referring now to FIG. 16, a top view of a collection chamber 28 is shown according to an example embodiment. As shown, the top door 36 is in the closed position, thereby closing off the top of the hopper volume 42. As discussed above, the top door 36 is configured to be movable between an open position (e.g., to allow refuse to be loaded into the hopper volume 42) and a closed position. In certain embodiments, the top door 36 may be closed in response to a thermal event being detected. For example, the top door 36 may be closed in response to a thermal event being detected in or near the refuse container 150 as the refuse container is being grabbed by the lifting system 30. Therefore, the refuse may be prevented from entering the hopper volume 42, preventing the spread of the thermal event to the hopper volume 42. In some embodiments, the top door 36 may be closed in response to a thermal event being detected in the hopper volume 42. Further, the compactor 50 may be closed in response to a thermal event being detected in the hopper volume 42, thereby isolating the hopper volume 42 from the storage volume 44. In this example embodiment, the thermal event may be isolated to the hopper volume 42, and the top door 36 and the compactor 50 may seal, or substantially seal (i.e., significantly reduce the amount of air that may enter the hopper volume 42), the hopper volume 42, thereby smothering any flames that may be present in the hopper volume 42.

Figure 17:
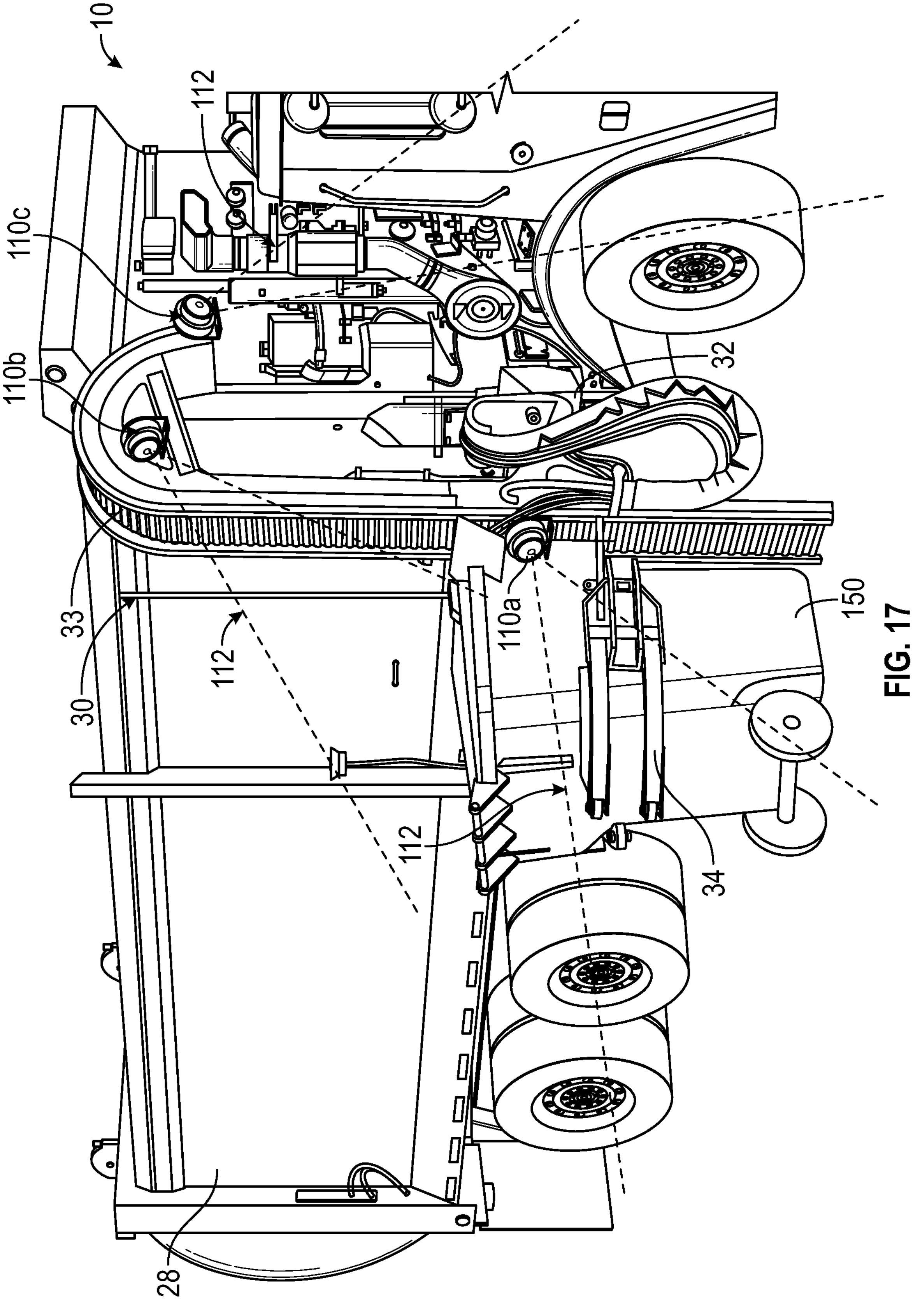
FIG. 17 is a perspective view of a thermal event monitoring system according to an exemplary embodiment.
Figure 18:
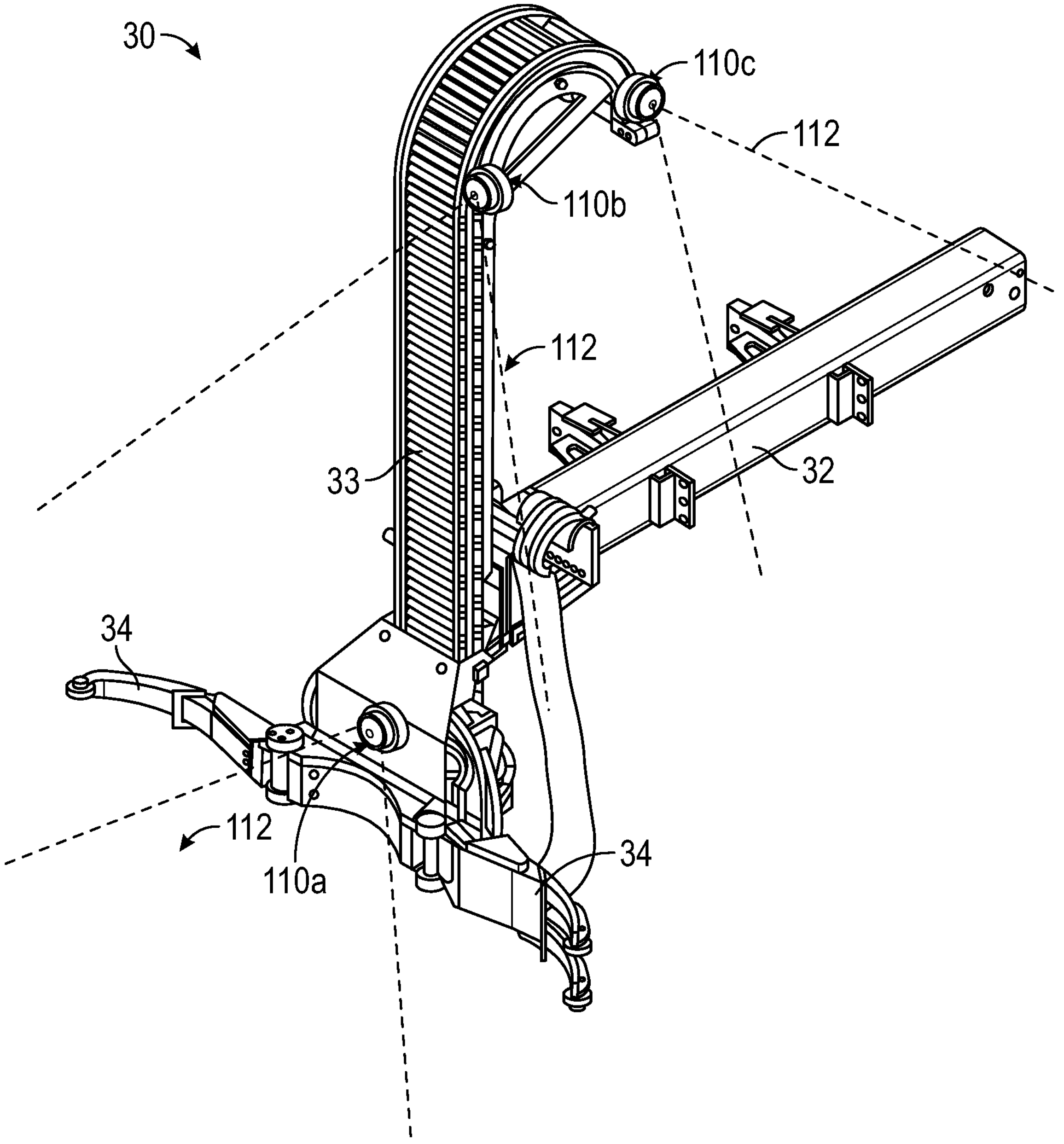
FIG. 18 is a perspective view of another thermal event monitoring system according to an exemplary embodiment.

Referring now to FIGS. 17 and 18, a lifting system 30 is shown according to an example embodiment. For example, the lifting system 30 may be part of the refuse vehicle 10, as shown in FIG. 17. The lifting system 30 is attached to the refuse vehicle by an arm 32. The lifting system includes forks 34 configured to grab refuse containers 150. Once the forks 34 grab the refuse container 150, a ladder system 33 configured to lift the refuse container 150 and empty the refuse within the refuse container 150 into the collection chamber 28. As shown, the lifting system 30 is utilized in a side loading refuse vehicle 10, however, it should be appreciated that the same or a similar lifting system 30 may be utilized in other types of refuse vehicles 10 (e.g., front loading or rear loading).

As shown, the lifting system 30 includes multiple sensors 110, according to an example embodiment. For example, the sensors 110 may be thermal imaging devices. Each sensor 110 has a FOV 112, such that the sensor 110 may detect a thermal event within the FOV. The first sensor 110*a* is located on the lifting system 30 near the forks 34. Therefore, as the forks 34 approach a refuse container 150, the first sensor 110*a* may detect a thermal event within that refuse container 150. The second sensor 110*b* is located further up on the ladder system 33. Therefore, the second sensor 110*b* may provide a top image of the refuse container 150 and as the refuse container 150 is raised by the lifting system 30, the second sensor 110*b* may further detect a thermal event within the refuse container 150. If at any point the first sensor 110*a* or the second sensor 110*b* detects a thermal event within the refuse container 150, the lifting system 33 may cease operation in response to the thermal event being detected, thereby preventing the refuse container 150 from being emptied into the collection chamber 28. The third sensor 110*c* is located on the ladder system 33 and the FOV 112 of the third sensor 110*c* is aimed towards the hopper volume 42 of the collection chamber 28. Therefore, the third sensor 110 is configured to detect a thermal event within the hopper volume 42. If a thermal event is detected in the hopper volume 42, the top door 36 and/or the compactor 50 may be closed in response to a thermal event being, thereby isolating the hopper volume 42 from other parts of the refuse vehicle 10.

Figure 19:
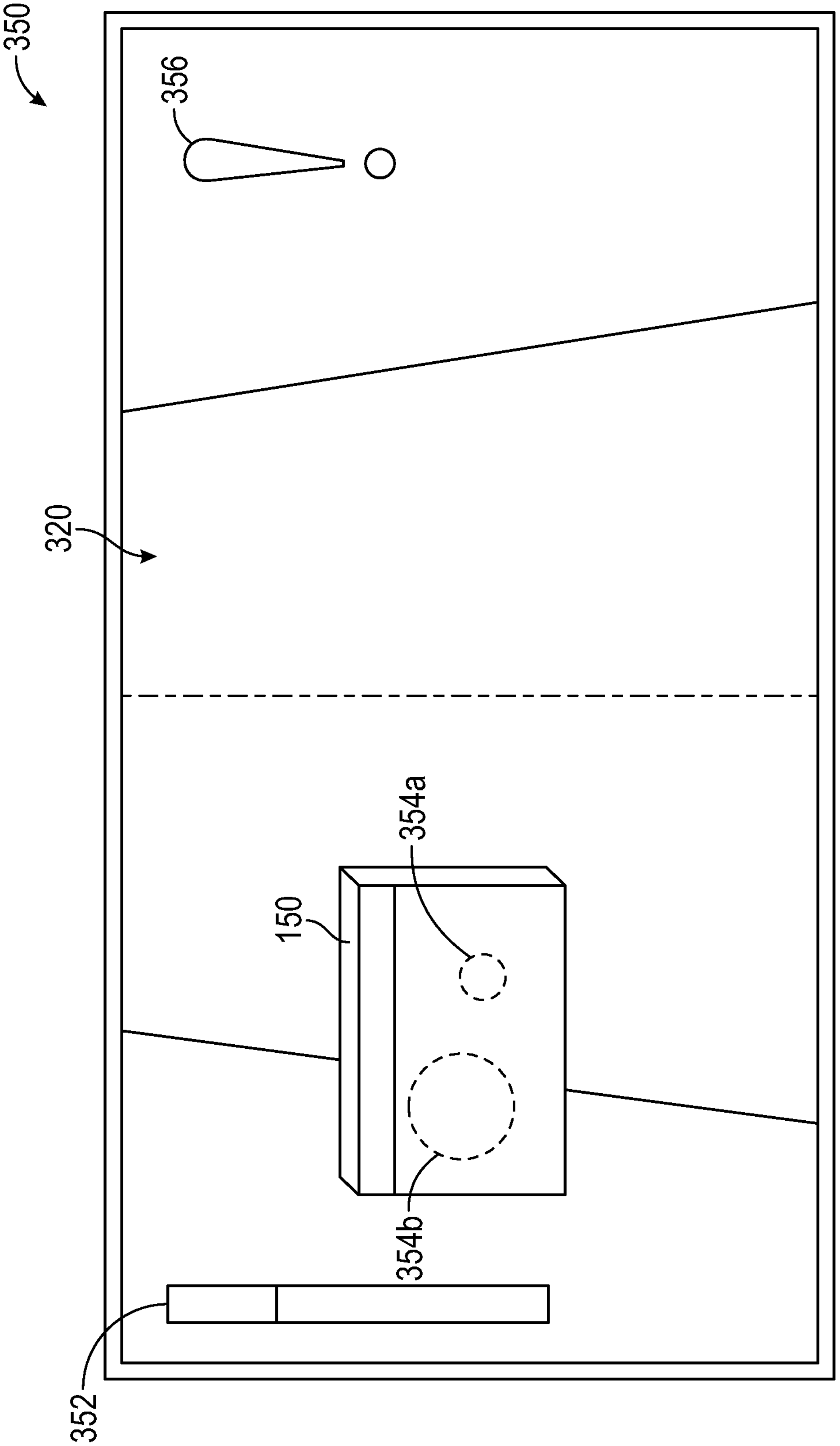
FIG. 19 is a GUI of a display device according to an exemplary embodiment.

Referring now to FIG. 19, a display device 350 is shown according to an example embodiment. The display device 350 is configured to display the user interface 320. In certain embodiments, the user interface 320 includes displaying an augmented reality view as captures by the sensor(s) 110. That is, the user interface 320 may include video footage of the environment surrounding the refuse vehicle 10 with various graphics laid over the video footage. For example, the user interface 320 may include thermal event tracker(s) 354. As shown, the user interface 320 includes a first thermal event tracker 354*a* and a second thermal event tracker 354*b* that indicate a thermal event within the refuse container 150. In certain embodiments, the thermal event trackers 354 may be colored to reflect the severity of the thermal event. For example, the second thermal event tracker 354*b* may be red to indicate that the thermal event is of high severity while the first thermal event tracker 354*a* may be yellow to indicate that the thermal event is of low severity. Further, the user interface 320 may include a thermal event notification 356. The thermal event notification 356 may be displayed in response to a thermal event being detected by at least one sensor 110 and may indicate that a thermal event has been detected within or nearby the refuse vehicle 10. Further, the user interface 320 may include meter 352. In certain embodiments, the meter 352 may display the range of temperatures captured by the sensors 110. For example, the meter 352 may be a color coded meter 352 (e.g., a color gradient from blue to red, wherein blue represents the coolest temperature detected and red represents the warmest temperature detected). In this example embodiment, the color of the thermal event tracker(s) 354 may be compared to the meter 352 such that the operator may estimate the temperature of the thermal event.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:

a chassis supporting a plurality of wheels;

a vehicle body supported by the chassis and defining a receptacle, a lifting system coupled to the vehicle body and movable relative to the receptacle, wherein the lifting system is configured to lift a refuse container and empty refuse in the refuse container into the receptacle;

at least one sensor; and a processing circuit configured to:

receive a signal from the at least one sensor;

detect a thermal event based on the signal; and, control the lifting system to stop lifting the refuse container in response to the thermal event being detected.

2. The refuse vehicle of claim 1, wherein the at least one sensor includes a sensor located on an arm of the lifting system.

3. The refuse vehicle of claim 1, further comprising at least one thermal suppression component, wherein the processing circuit is configured to activate the thermal suppression component in response to detecting the thermal event.

4. The refuse vehicle of claim 3, wherein the at least one thermal suppression component is located on an arm of the lifting system.

5. The refuse vehicle of claim 1, wherein the receptacle comprises a hopper volume, a storage volume, and a top opening, wherein the refuse is loaded into the hopper volume through the top opening.

6. The refuse vehicle of claim 5, further comprising a top door, wherein the processing circuit is configured to control the top door to close the top opening in response to the thermal event being detected.

7. The refuse vehicle of claim 5, wherein the hopper volume and the storage volume are separated by a compactor, wherein the compactor is movable between an open position and a closed position, and wherein the processing circuit is configured to control the compactor such that the compactor moves to the closed position in response to the thermal event being detected.

8. The refuse vehicle of claim 1, wherein the at least one sensor includes a thermal camera.

9. The refuse vehicle of claim 1, wherein the at least one sensor includes a plurality of sensors.

10. The refuse vehicle of claim 9, wherein the plurality of sensors are located on the lifting system.

11. The refuse vehicle of claim 10, wherein the plurality of sensors include a first sensor positioned to facilitate detecting the thermal event in the refuse container and a second sensor positioned to facilitate detecting the thermal event in the receptacle.

12. The refuse vehicle of claim 1, wherein the at least one sensor includes a sensor positioned to facilitate detecting the thermal event in the refuse container.

13. The refuse vehicle of claim 1, wherein the at least one sensor includes a sensor positioned to facilitate detecting the thermal event in the receptacle.

* * * * *